US010606400B2

(12) United States Patent
Chen et al.

(10) Patent No.: US 10,606,400 B2
(45) Date of Patent: Mar. 31, 2020

(54) TOUCH PANEL DRIVING APPARATUS

(71) Applicants: Industrial Technology Research Institute, Hsinchu (TW); Intellectual Property Innovation Corporation, Hsinchu (TW)

(72) Inventors: Heng-Yin Chen, Hsinchu County (TW); Yi-Chuan Lu, Kinmen County (TW); Chien-Ju Lee, Taoyuan (TW); Chang-Po Chao, Taipei (TW); Guan-Jung Luo, Taichung (TW); Ying-Jia Lin, Yunlin County (TW)

(73) Assignees: Industrial Technology Research Institute, Hsinchu (TW); Intellectual Property Innovation Corporation, Hsinchu (TW)

( * ) Notice: Subject to any disclaimer, the term of this patent is extended or adjusted under 35 U.S.C. 154(b) by 184 days.

(21) Appl. No.: 15/936,456

(22) Filed: Mar. 27, 2018

(65) Prior Publication Data
US 2019/0163312 A1 May 30, 2019

(30) Foreign Application Priority Data

Nov. 28, 2017 (TW) .............................. 106141402 A

(51) Int. Cl.
*G06F 3/041* (2006.01)
*G06F 3/047* (2006.01)
*G06F 3/044* (2006.01)

(52) U.S. Cl.
CPC ............ *G06F 3/0416* (2013.01); *G06F 3/047* (2013.01); *G06F 3/0418* (2013.01); *G06F 3/04166* (2019.05); *G06F 3/044* (2013.01)

(58) Field of Classification Search
CPC combination set(s) only.
See application file for complete search history.

(56) References Cited

U.S. PATENT DOCUMENTS 8,305,360 B2  11/2012  Wu
8,411,066 B2  4/2013  Cordeiro et al.
(Continued)

FOREIGN PATENT DOCUMENTS

CN    101673163    3/2010
CN    101937662    1/2011
(Continued)

OTHER PUBLICATIONS

"Office Action of China Related Application No. 201510973204.8", dated Jan. 16, 2019, pp. 1-5.

(Continued)

*Primary Examiner* — Viet D Pham
(74) *Attorney, Agent, or Firm* — JCIPRNET

(57) ABSTRACT

A touch panel driving apparatus generates a differential signal corresponding to a detection result of a touch panel. The touch panel driving apparatus includes a driving circuit, a first integrating sampling circuit, and a second integrating sampling circuit. The first integrating sampling circuit generates a first end signal of the differential signal. The second integrating sampling circuit generates a second end signal of the differential signal. When a touch event does not occur, a level of the first end signal and a level of the second end signal are in a common mode signal range of the differential signal. When the touch event occurs, the first integrating sampling circuit pulls up the level of the first end signal out of the common mode signal range, and the second integrating sampling circuit pulls down the level of the second end signal out of the common mode signal range.

20 Claims, 9 Drawing Sheets

(56) References Cited

U.S. PATENT DOCUMENTS

| | | | |
|---|---|---|---|
| 8,508,503 | B2 | 8/2013 | Lin et al. |
| 8,890,841 | B2* | 11/2014 | Rebeschi ............... G06F 3/0418 345/174 |
| 8,982,093 | B2 | 3/2015 | Wei et al. |
| 9,134,824 | B2 | 9/2015 | Kang et al. |
| 9,244,569 | B2 | 1/2016 | Guedon et al. |
| 2011/0242048 | A1 | 10/2011 | Guedon et al. |
| 2013/0141139 | A1 | 6/2013 | Ballan et al. |
| 2013/0176233 | A1 | 7/2013 | Lin et al. |
| 2013/0222338 | A1 | 8/2013 | Gim et al. |
| 2013/0249825 | A1 | 9/2013 | Kang et al. |
| 2013/0265242 | A1 | 10/2013 | Richards et al. |
| 2015/0029141 | A1* | 1/2015 | Jo ............................ G06F 3/044 345/174 |
| 2015/0277607 | A1 | 10/2015 | Kosugi et al. |
| 2016/0026335 | A1 | 1/2016 | Ahn et al. |
| 2017/0123551 | A1* | 5/2017 | Li .......................... G06F 3/0416 |
| 2017/0131838 | A1* | 5/2017 | Lu .......................... G06F 3/0418 |
| 2018/0172744 | A1* | 6/2018 | Chang .................. H03K 17/962 |

FOREIGN PATENT DOCUMENTS

| | | |
|---|---|---|
| CN | 104156096 | 11/2014 |
| CN | 105630261 | 6/2016 |
| TW | 201350800 | 12/2013 |
| TW | I438413 | 5/2014 |
| TW | 201433948 | 9/2014 |
| TW | I466028 | 12/2014 |
| TW | 201506750 | 2/2015 |
| TW | I472165 | 2/2015 |
| TW | I492137 | 7/2015 |
| TW | I527005 | 3/2016 |
| TW | I569185 | 2/2017 |
| WO | 2014196188 | 12/2014 |

OTHER PUBLICATIONS

Jae-Hun Jun, et al., "In-Cell Self-Capacitive-Type Mobile Touch System and Embedded Readout Circuit in Display Driver IC," Journal of Display Technology, vol. 12, No. 12, Dec. 2016, pp. 1613-1622.

Hyungcheol Shin, et al., "A 55dB SNR with 240Hz Frame Scan Rate Mutual Capacitor 30x24 Touch-Screen Panel Read-Out IC Using Code-Division Multiple Sensing Technique," 2013 IEEE International Solid-State Circuits Conference, Feb. 20, 2013, pp. 388-389.

Ik-Seok Yang, et al., "A Touch Controller Using Differential Sensing Method for On-Cell Capacitive Touch Screen Panel Systems," IEEE Transactions on Consumer Electronics, vol. 57, Issue3, Aug. 2011, pp. 1027-1032.

Yeong-Shin Jang, et al., "A 45 dB, 150 Hz and 18 mW Touch Controller for On-Cell Capacitive TSP Systems," IEEE Transactions on Circuits and Systems II: Express Briefs, vol. 61, Issue 10, Aug. 5, 2014, pp. 748-752.

Jun-Hyeok Yang, et al., "A Highly Noise-Immune Touch Controller Using Filtered-Delta-Integration and a Charge-Interpolation Technique for 10.1-inch Capacitive Touch-Screen Panels," 2013 IEEE International Solid-State Circuits Conference Digest of Technical Papers (ISSCC), Feb. 17-21, 2013, pp. 390-391.

"Office Action of Taiwan Related Application No. 104136606," dated Aug. 23, 2016, p. 1-p. 11.

"Notice of allowance of Taiwan Counterpart Application", dated May 3, 2018, p. 1-p. 5.

* cited by examiner

TOUCH PANEL DRIVING APPARATUS

CROSS-REFERENCE TO RELATED APPLICATION

This application claims the priority benefit of Taiwan application serial no. 106141402, filed on Nov. 28, 2017. The entirety of the above-mentioned patent application is hereby incorporated by reference herein and made a part of this specification.

BACKGROUND

Technical Field

The disclosure relates to a touch panel driving apparatus.

Description of Related Art

A driving apparatus of a touch panel is responsible for converting an amount of change in electric charge of the touch panel into an electrical signal. A touch panel driving apparatus amplifies a sensing signal. The amplified sensing signal contributes to subsequent processes performed by an operational circuit. Due to the "thinness" development trends, the touch panel is generally integrated into a display panel. As a distance between an electrode of the touch panel and an electrode of the display panel becomes smaller and smaller, disturbance effect caused by the display panel also becomes more and more serious. Moreover, since the touch panel driving apparatus amplifies the sensing signal, noise is also increased accordingly.

Generally, a signal-to-noise ratio (SNR) of a signal outputted by the touch panel driving apparatus should be as great as possible. The signal-to-noise ratio is $10 \log_{10}(S/N)$, wherein S represents a swing range of the signal (e.g., the signal S may be a swing range of the signal outputted by the touch panel driving apparatus when a touch event occurs on the touch panel), and N represents a swing range of the noise (e.g., the noise N may be a swing range of the signal outputted by the touch panel driving apparatus when the touch event does not occur on the touch panel). The greater the signal-to-noise ratio of the signal outputted by the touch panel driving apparatus is, the more likely the operational circuit is to subsequently identify the signal and the noise. If the touch panel driving apparatus can generate an output signal having a high swing amplitude and a high signal-to-noise ratio, the operational circuit can more easily and more accurately process the sensing signal in subsequent processes. Accordingly, how to realize a touch panel driving apparatus with a high swing amplitude and a high signal-to-noise ratio is one of the issues in the technical field of touch devices.

SUMMARY

An embodiment of the disclosure provides a touch panel driving apparatus configured to drive a touch panel to generate a differential signal corresponding to a detection result of the touch panel. The touch panel driving apparatus includes a driving circuit, a first integrating sampling circuit, and a second integrating sampling circuit. During a first clock period, the driving circuit provides a first driving signal to a driving line of the touch panel and receives a sensing signal from a sensing line of the touch panel. During a second clock period, the driving circuit provides a second driving signal to the driving line of the touch panel and receives the sensing signal from the sensing line of the touch panel. The first integrating sampling circuit is coupled to the driving circuit to receive the sensing signal during the first clock period. The first integrating sampling circuit generates a first end signal in the differential signal. When a sensing electrode of the sensing line does not detect a touch event, a level of the first end signal is in a common mode signal range of the differential signal. When the sensing electrode of the sensing line detects the touch event, the first integrating sampling circuit pulls up the level of the first end signal out of the common mode signal range according to the sensing signal. The second integrating sampling circuit is coupled to the driving circuit to receive the sensing signal during the second clock period. The second integrating sampling circuit generates a second end signal in the differential signal. When the sensing electrode of the sensing line does not detect the touch event, a level of the second end signal is in the common mode signal range. When the sensing electrode of the sensing line detects the touch event, the second integrating sampling circuit pulls down the level of the second end signal out of the common mode signal range according to the sensing signal.

To provide a further understanding of the disclosure, exemplary embodiments, together with the reference drawings, are described in detail below.

DESCRIPTION OF THE EMBODIMENTS

Figure 1:
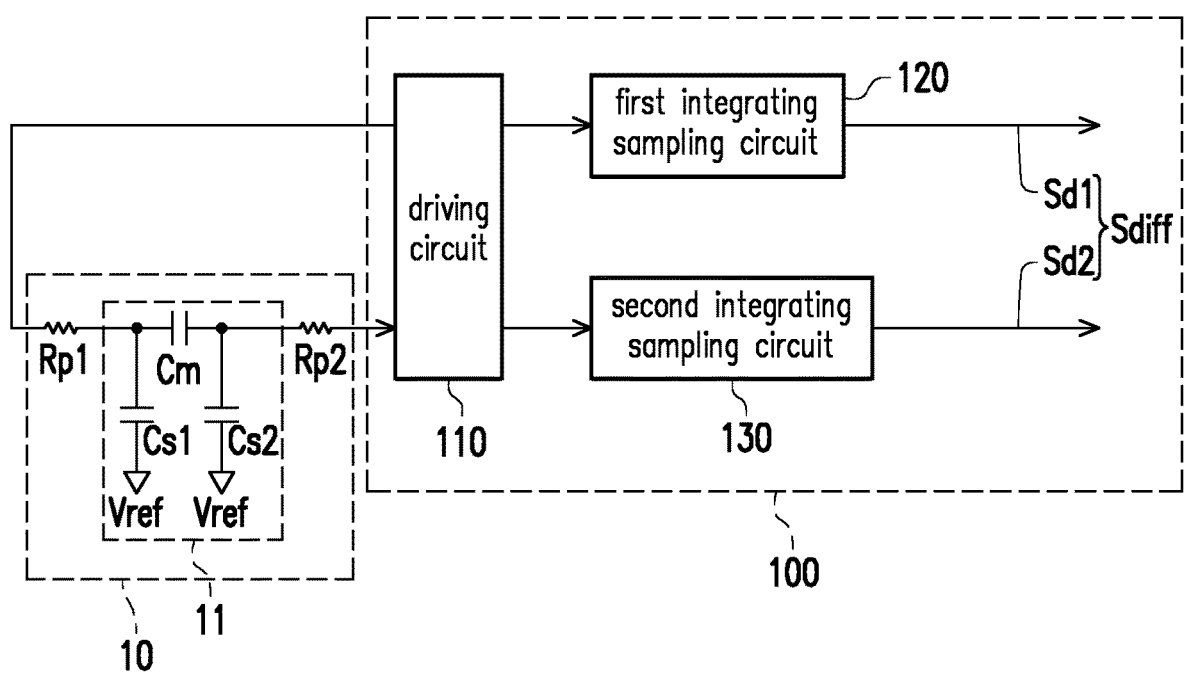
FIG. 1 is a circuit block schematic diagram illustrating a touch panel driving apparatus according to an embodiment of the disclosure.

The term "couple or (connect)" used in the full text of the specification (including the claims) refers to any direct or indirect connection means. For example, if a first device is described to be coupled (or connected) to a second device in the text, it is interpreted that the first device is directly connected to the second device, or that the first device is indirectly connected to the second device through other devices or some connection means. Moreover, wherever possible, elements/components/steps labeled with the same reference numerals represent the same or similar parts in the drawings and embodiments. Reference may be made between the elements/components/steps labeled with the same reference numerals or described in the same terms in different embodiments for relevant descriptions.

A touch panel driving apparatus described in the embodiments of the disclosure reads a sensing signal of a touch panel by using two integrating sampling circuits to further respectively generate a first end signal and a second end signal in a differential signal. When a touch event does not occur, levels of the first end signal and the second end signal are in a common mode signal range of the differential signal. When the touch event occurs, the first integrating sampling circuit pulls up the level of the first end signal out of the common mode signal range, and the second integrating sampling circuit pulls down the level of the second end signal out of the common mode signal range. Therefore, the touch panel driving apparatus described in the embodiments of the disclosure can correspondingly generate a differential signal having a high swing amplitude and a high signal-to-noise ratio according to a detection result of the touch panel.

FIG. 1 is a circuit block schematic diagram illustrating a touch panel driving apparatus 100 according to an embodiment of the disclosure. The touch panel driving apparatus 100 drives a touch panel 10 to generate a differential signal Sdiff corresponding to a detection result of the touch panel 10. The touch panel driving apparatus 100 includes a driving circuit 110, a first integrating sampling circuit 120, and a second integrating sampling circuit 130.

Referring to FIG. 1, the touch panel 10 is provided with one or more touch units (e.g., a touch unit 11) to sense whether a touch event occurs on the touch panel 10. According to different design requirements, the touch unit 11 may have different layout structure designs. FIG. 1 illustrates an equivalent circuit of the touch unit 11. The touch unit 11 includes a first electrode and a second electrode, wherein a mutual capacitor Cm is formed between the first electrode and the second electrode. Moreover, the first electrode and a driving line have a parasitic capacitor Cs1, and the second electrode and a sensing line have a parasitic capacitor Cs2. The parasitic capacitor is also referred to as a stray capacitor. According to different design requirements, the first electrode and the second electrode may be transparent electrodes, semi-transparent electrodes, or non-transparent electrodes. For example, in the present embodiment, the first electrode and the second electrode may be implemented by using indium tin oxide (ITO).

The touch panel 10 is provided with one or more driving lines. The driving circuit 110 is coupled to the first electrode of the touch unit 11 through the driving line to provide a driving signal to the first electrode of the touch unit 11. The driving line has a parasitic resistor Rp1. The touch panel 10 is further provided with one or more sensing lines. The second electrode of the touch unit 11 is coupled to the sensing line. The sensing line has a parasitic resistor Rp2. A sensing end of the driving circuit 110 is coupled to the sensing line of the touch panel 10 to read touch information (sensing signal) of the touch unit 11 in the touch panel 10. According to different design requirements, the driving line and the sensing line may be transparent conductive lines, semi-transparent conductive lines, or non-transparent conductive lines. For example, in the present embodiment, the driving line and the sensing line may be implemented by using ITO conductive lines.

In a sensing operation of the touch unit 11, the driving circuit 110 provides the driving signal to the first electrode of the touch unit 11 through the driving line, and the driving circuit 110 synchronously receives the sensing signal of the touch unit 11 through the sensing line. The first integrating sampling circuit 120 is coupled to the driving circuit 110 to receive the sensing signal. The second integrating sampling circuit 130 is coupled to the driving circuit 110 to receive the sensing signal. For example, during a first clock period, the driving circuit 110 provides a first driving signal to the driving line of the touch panel 10 and receives a sensing signal from the sensing line of the touch panel 10, and transmits the sensing signal to the first integrating sampling circuit 120. During a second clock period, the driving circuit 110 provides a second driving signal to the driving line of the touch panel 10 and receives the sensing signal from the sensing line of the touch panel 10, and transmits the sensing signal to the second integrating sampling circuit 130. During a third clock period, reference may be made to the relevant description of the first clock period for the operation of the driving circuit 110. During a fourth clock period, reference may be made to the relevant description of the second clock period for the operation of the driving circuit 110. Operations during the rest of the clock periods may be inferred in the same manner.

The first integrating sampling circuit 120 generates a first end signal Sd1 in the differential signal Sdiff. The second integrating sampling circuit 130 generates a second end signal Sd2 in the differential signal Sdiff. When a sensing electrode (e.g., the electrode of the touch unit 11) of the sensing line does not detect a touch event, a level of the first end signal Sd1 and a level of the second end signal Sd2 are in a common mode signal range of the differential signal Sdiff. For example, it is supposed that, without an amount of change resulting from ambient disturbance, when the touch event does not occur, the first integrating sampling circuit 120 and the second integrating sampling circuit 130 respectively maintain the level of the first end signal Sd1 and the level of the second end signal Sd2 at around a common voltage Vref. A level of the common voltage Vref may be determined according to the design requirement. For example, the level of the common voltage Vref may be 1.65V or another voltage level. In some embodiments, the common voltage Vref may be an electrode signal of the touch panel 10, or may be a common reference voltage of the electrode of the touch panel 10.

When the sensing electrode (e.g., the electrode of the touch unit 11) of the sensing line detects the touch event, the first integrating sampling circuit 120 pulls up the level of the first end signal Sd1 out of the common mode signal range according to the sensing signal of the sensing line, and the second integrating sampling circuit 130 pulls down the level of the second end signal Sd2 out of the common mode signal range according to the sensing signal of the sensing line. For example, when the touch event occurs, the first integrating sampling circuit 120 performs a forward integration (upward integration) operation on the sensing signal of the sensing line. Therefore, during the integrating operation, the level of the first end signal Sd1 is gradually pulled up from the common voltage Vref. Similarly, when the touch event occurs, the second integrating sampling circuit 130 performs a reverse integration (downward integration) operation on the sensing signal of the sensing line. Therefore, during the integrating operation, the level of the second end signal Sd2 is gradually pulled down from the common voltage Vref.

Reset cycles of the integrating operations of the first integrating sampling circuit 120 and the second integrating sampling circuit 130 may be dynamically adjusted according to the design requirement (or implementation requirement). In some embodiments, if high speed operation is needed in some design requirements (or implementation requirements), the reset cycle of the integrating operation may be dynamically adjusted to be smaller (i.e., performing resetting earlier). In some other embodiments, when the reset cycle of the integrating operation is increased (i.e., performing resetting later), a voltage difference between the first end signal Sd1 and the second end signal Sd2 is increased to satisfy the design requirement (or implementation requirement) for a high swing amplitude and a high signal-to-noise ratio (SNR). Therefore, the touch panel driving apparatus 100 described in the present embodiment can correspondingly generate the differential signal Sdiff having a high swing amplitude and a high signal-to-noise ratio according to the detection result of the touch panel 10.

Figure 2:
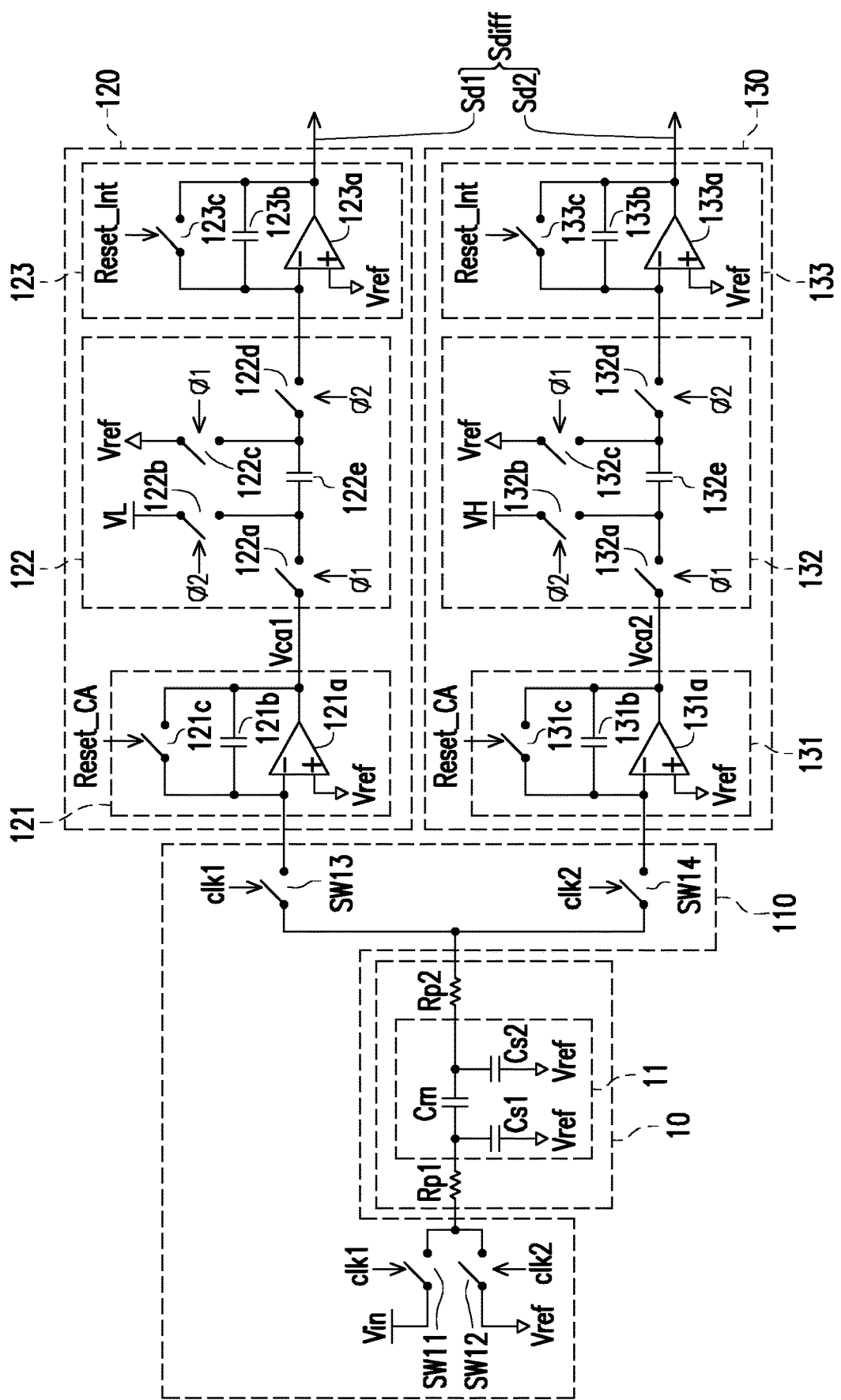
FIG. 2 is a circuit block schematic diagram illustrating the touch panel driving apparatus shown in FIG. 1 according to an embodiment of the disclosure.

FIG. 2 is a circuit block schematic diagram illustrating the touch panel driving apparatus 100 shown in FIG. 1 according to an embodiment of the disclosure. In the embodiment shown in FIG. 2, the driving circuit 110 includes a first switch SW11, a second switch SW12, a third switch SW13, and a fourth switch SW14. A first terminal of the first switch SW11 is coupled to a first driving signal Vin. A second terminal of the first switch SW11 is coupled to the driving line of the touch panel 10. A control terminal of the first switch SW11 is controlled by a clock signal clk1. Based on control of the clock signal clk1, the first switch SW11 transmits the first driving signal Vin to the driving line of the touch panel during a first clock period and does not transmit the first driving signal Vin during a second clock period. A first terminal of the second switch SW12 is coupled to a second driving signal. In the embodiment shown in FIG. 2, the common voltage Vref of the touch panel 10 is used as the second driving signal. A second terminal of the second switch SW12 is coupled to the driving line of the touch panel 10. A control terminal of the second switch SW12 is controlled by a clock signal clk2. Based on control of the clock signal clk2, the second switch SW12 transmits the second driving signal (the common voltage Vref) to the driving line of the touch panel 10 during the second clock period and does not transmit the second driving signal (the common voltage Vref) during the first clock period. Levels of the first driving signal Vin and the second driving signal (the common voltage Vref) may be determined according to the design requirement. For example, the first driving signal Vin may be a fixed voltage, and the level of the first driving signal Vin may be higher than the level of the second driving signal (the common voltage Vref).

A first terminal of the third switch SW13 is coupled to the first integrating sampling circuit 120. A second terminal of the third switch SW13 is coupled to the sensing line of the touch panel 10. A control terminal of the third switch SW13 is controlled by the clock signal clk1. Based on control of the clock signal clk1, the third switch SW13 transmits a sensing signal of the sensing line of the touch panel 10 to the first integrating sampling circuit 120 during the first clock period and does not transmit the sensing signal of the sensing line of the touch panel 10 during the second clock period. A first terminal of the fourth switch SW14 is coupled to the second integrating sampling circuit 130. A second terminal of the fourth switch SW14 is coupled to the sensing line of the touch panel 10. A control terminal of the fourth switch SW14 is controlled by the clock signal clk2. Based on control of the clock signal clk2, the fourth switch SW14 transmits the sensing signal of the sensing line of the touch panel 10 to the second integrating sampling circuit 130 during the second clock period and does not transmit the sensing signal of the sensing line of the touch panel 10 during the first clock period.

Figure 3:
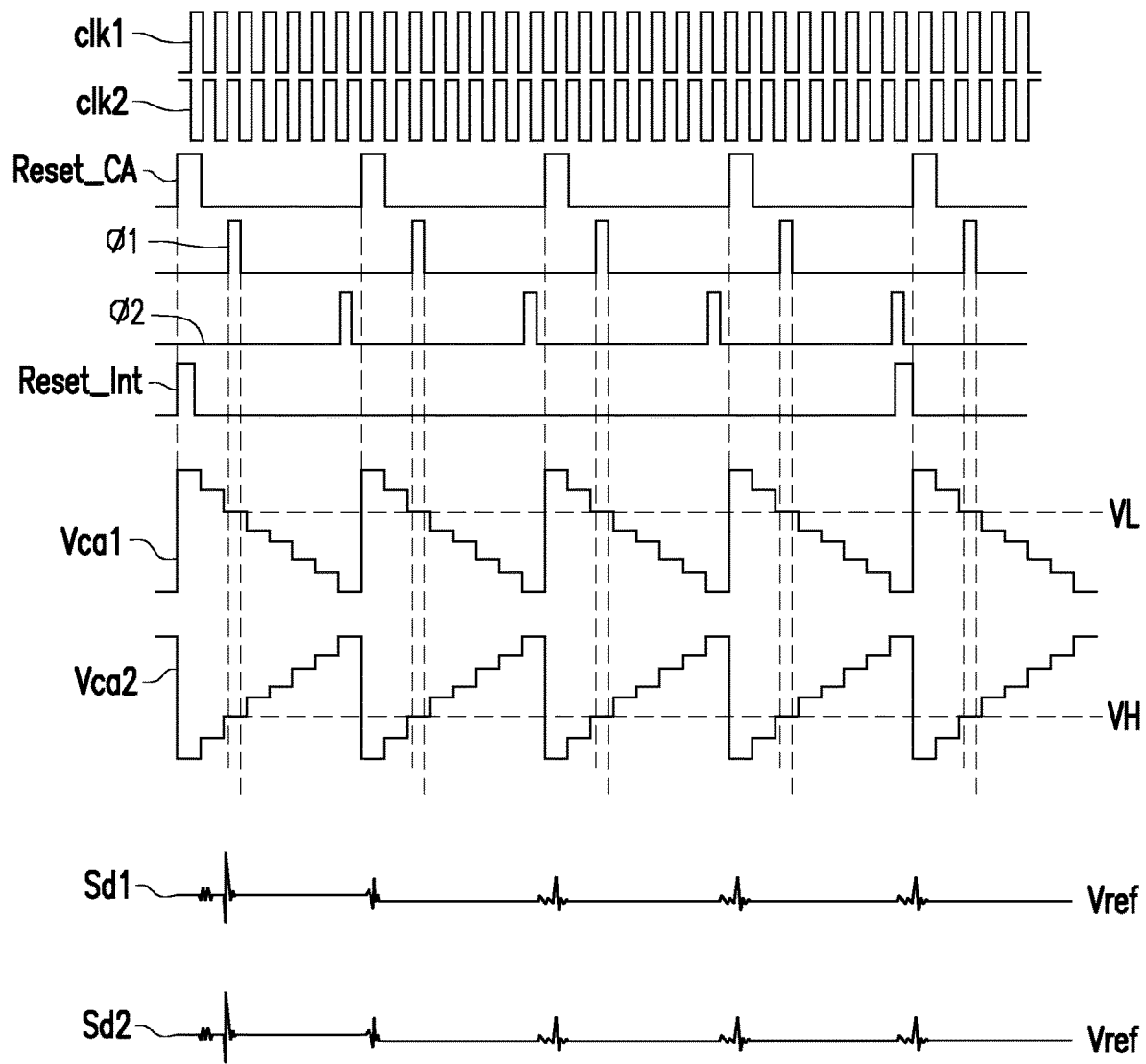
FIG. 3 is a schematic diagram illustrating a signal sequence of the circuit shown in FIG. 2 at the time when a touch event does not occur on a touch panel according to an embodiment of the disclosure.
Figure 4:
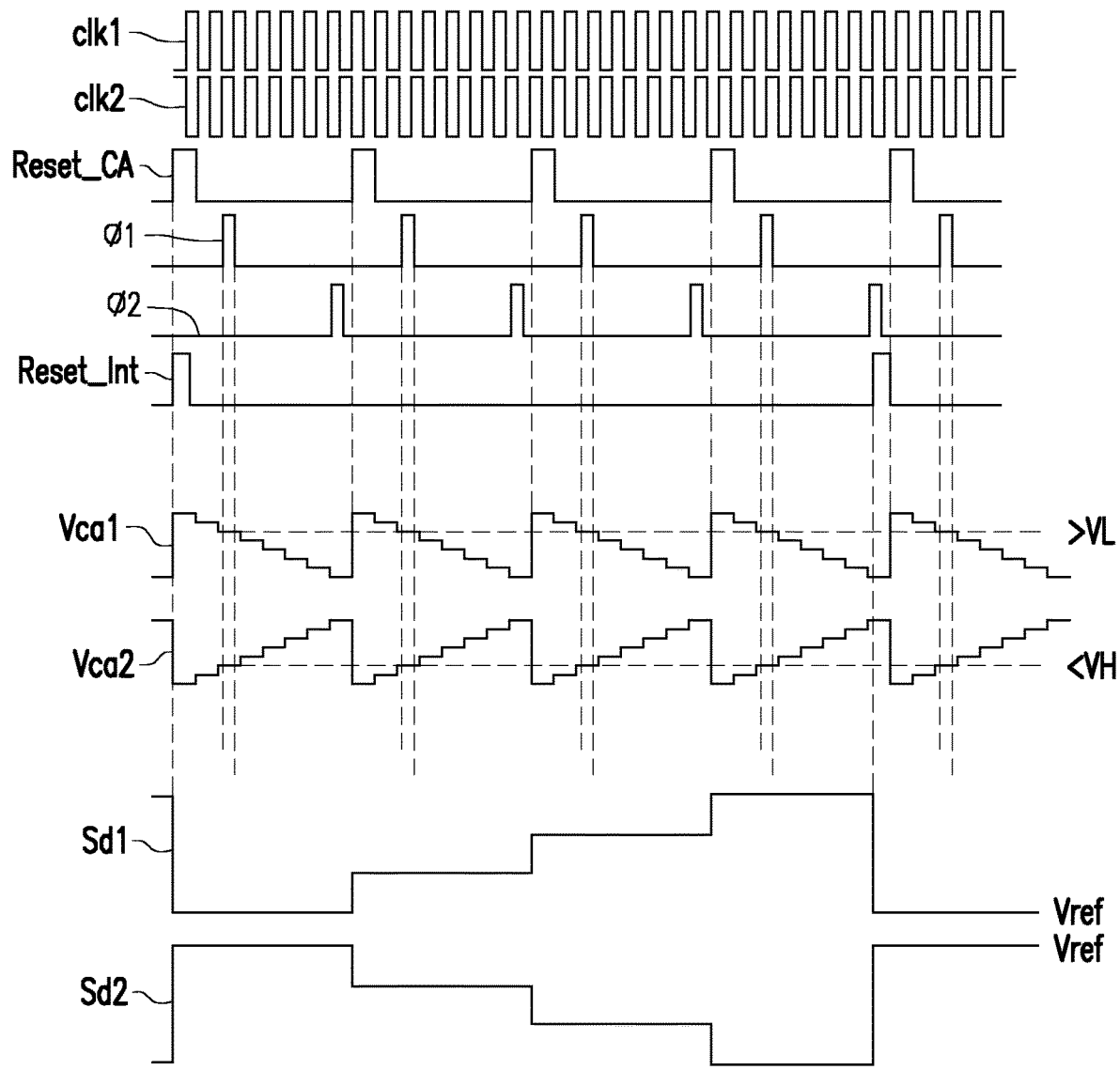
FIG. 4 is a schematic diagram illustrating a signal sequence of the circuit shown in FIG. 2 at the time when the touch event occurs on the touch panel according to an embodiment of the disclosure.

FIG. 3 is a schematic diagram illustrating a signal sequence of the circuit shown in FIG. 2 at the time when the touch event does not occur on the touch panel 10 according to an embodiment of the disclosure. FIG. 4 is a schematic diagram illustrating a signal sequence of the circuit shown in FIG. 2 at the time when the touch event occurs on the touch panel 10 according to an embodiment of the disclosure. In FIG. 3 and FIG. 4, the horizontal axis represents time, and the vertical axis represents voltage. Please refer to FIG. 2, FIG. 3, and FIG. 4. Pulses of the clock signal clk1 and pulses of the clock signal clk2 do not overlap with each other. Therefore, during the first clock period, the first switch SW11 and the third switch SW13 are turned on, and the second switch SW12 and the fourth switch SW14 are turned off. During the second clock period, the first switch SW11 and the third switch SW13 are turned off, and the second switch SW12 and the fourth switch SW14 are turned on.

The first integrating sampling circuit 120 includes a reverse integrating circuit 121, a delta-adding correlated double sampling (DCDS) circuit 122, and a forward integrating circuit 123. The reverse integrating circuit 121 is coupled to the third switch SW13. When the third switch SW13 is turned on, the reverse integrating circuit 121 receives the sensing signal of the sensing line of the touch panel 10. The reverse integrating circuit 121 performs a reverse integrating operation on the sensing signal of the sensing line of the touch panel 10 to output an integration result Vca1 to the DCDS circuit 122. In other words, based on the sensing signal, a level of the integration result Vca1 is gradually pulled down during the reverse integrating operation until the integration result Vca1 is reset (as shown in FIG. 3 and FIG. 4). Due to occurrence of the touch event, a range of drop (the voltage level after integration) of the integration result Vca1 shown in FIG. 4 is different from a range of drop of the integration result Vca1 shown in FIG. 3.

The DCDS circuit 122 is coupled to an output terminal of the reverse integrating circuit 121 to receive the integration result Vca1. The DCDS circuit 122 is controlled by a first control signal $\phi 1$ and a second control signal $\phi 2$. Examples of sequences of the first control signal $\phi 1$ and the second control signal $\phi 2$ are illustrated in FIG. 3 and FIG. 4. A pulse width of the first control signal $\phi 1$ defines a "sampling period" of the DCDS circuit 122, and a pulse width of the second control signal $\phi 2$ defines an "output period" of the DCDS circuit 122. Based on control of the first control signal $\phi 1$, the DCDS circuit 122 samples the integration result Vca1 during the sampling period to obtain a sampling result. Based on control of the second control signal $\phi 2$, the DCDS circuit 122 pumps the sampling result by using a reference voltage VL during the output period to obtain a pumping result. After the output period ends, the reverse integrating circuit 121 is reset. In other words, after the pulse of the second control signal $\phi 2$ ends, a pulse occurs in a reset signal Reset_CA to reset the reverse integrating circuit 121 (as shown in FIG. 3 and FIG. 4). A level of the reference voltage VL may be determined according to the design requirement. For example, it is supposed that a level of the sampling result of the DCDS circuit 122 at the time when the sensing electrode of the sensing line of the touch panel 10 does not detect the touch event is an "untouched level", then the level of the reference voltage VL may be set at the "untouched level". The level of the reference voltage VL may be lower than the level of the common voltage Vref.

When the touch event does not occur (as shown in FIG. 3), since the level of the sampling result of the DCDS circuit 122 is identical to the level of the reference voltage VL, the DCDS circuit 122 does not have excessive electric charge to transfer to the forward integrating circuit 123. When the touch event occurs (as shown in FIG. 4), since the level of the sampling result of the DCDS circuit 122 is different from the level of the reference voltage VL, the DCDS circuit 122 transfers excessive electric charge to the forward integrating circuit 123.

The forward integrating circuit 123 is coupled to an output terminal of the DCDS circuit 122 to receive the pumping result. The forward integrating circuit 123 performs a forward integrating operation on the pumping result to output an integration result as the first end signal Sd1. When the touch event occurs, since the pumping result of the DCDS circuit 122 includes the electric charge, the level of the first end signal Sd1 is gradually pulled up during the forward integrating operation until the first end signal Sd1 is reset. A pulse of a reset signal Reset_Int resets the forward integrating circuit 123 and thereby resets the first end signal Sd1 (as shown in FIG. 4). When the touch event does not occur, the DCDS circuit 122 does not have excessive electric charge to transfer to the forward integrating circuit 123. Therefore, the forward integrating circuit 123 can maintain the level of the first end signal Sd1 in the common mode signal range of the differential signal Sdiff. For example, the forward integrating circuit 123 maintains the level of the first end signal Sd1 at the common voltage Vref (as shown in FIG. 3).

Similar to the first integrating sampling circuit 120, the second integrating sampling circuit 130 includes a forward integrating circuit 131, a DCDS circuit 132, and a reverse integrating circuit 133. The forward integrating circuit 131 is coupled to the fourth switch SW14. When the fourth switch SW14 is turned on, the forward integrating circuit 131 receives the sensing signal of the sensing line of the touch panel 10. The forward integrating circuit 131 performs a forward integrating operation on the sensing signal to output an integration result Vca2 to the DCDS circuit 132. In other words, based on the sensing signal, a level of the integration result Vca2 is gradually pulled up during the forward integrating operation until the integration result Vca2 is reset (as shown in FIG. 3 and FIG. 4). Due to occurrence of the touch event, a range of rise (the voltage level after integration) of the integration result Vca2 shown in FIG. 4 is different from a range of rise of the integration result Vca2 shown in FIG. 3.

The DCDS circuit 132 is coupled to an output terminal of the forward integrating circuit 131 to receive the integration result Vca2. The DCDS circuit 132 is controlled by the first control signal φ1 and the second control signal φ2. Based on control of the first control signal φ1, the DCDS circuit 132 samples the integration result Vca2 during the sampling period to obtain a sampling result. Based on control of the second control signal φ2, the DCDS circuit 132 pumps the sampling result by using a reference voltage VH during the output period to obtain a pumping result. After the output period ends, the forward integrating circuit 131 is reset (as shown in FIG. 3 and FIG. 4). A level of the reference voltage VH may be determined according to the design requirement. For example, it is supposed that a level of the sampling result of the DCDS circuit 132 at the time when the sensing electrode of the sensing line of the touch panel 10 does not detect the touch event is an "untouched level", then the level of the reference voltage VH may be set at the "untouched level". The level of the reference voltage VH may be higher than the level of the common voltage Vref. When the touch event does not occur, since the level of the integration result Vca2 is identical to the level of the reference voltage VH, the DCDS circuit 132 does not have excessive electric charge to transfer to the reverse integrating circuit 133. When the touch event occurs, since the level of the sampling result of the DCDS circuit 132 is different from the level of the reference voltage VH, the DCDS circuit 132 transfers excessive electric charge to the reverse integrating circuit 133.

The reverse integrating circuit 133 is coupled to an output terminal of the DCDS circuit 132 to receive the pumping result. The reverse integrating circuit 133 performs a reverse integrating operation on the pumping result to output an integration result as the second end signal Sd2. When the touch event occurs, since the pumping result of the DCDS circuit 132 includes the electric charge, the level of the second end signal Sd2 is gradually pulled down during the reverse integrating operation until the second end signal Sd2 is reset. The pulse of the reset signal Reset_Int resets the reverse integrating circuit 133 and thereby resets the second end signal Sd2 (as shown in FIG. 4). When the touch event does not occur, the DCDS circuit 132 does not have excessive electric charge to transfer to the reverse integrating circuit 133. Therefore, the reverse integrating circuit 133 can maintain the level of the second end signal Sd2 in the common mode signal range of the differential signal Sdiff. For example, the reverse integrating circuit 133 maintains the level of the second end signal Sd2 at the common voltage Vref (as shown in FIG. 3).

In the embodiment shown in FIG. 2, the reverse integrating circuit 121 includes an operational amplifier 121a, a feedback capacitor 121b, and a reset switch 121c. An inverting input terminal of the operational amplifier 121a is coupled to the third switch SW13 to receive the sensing signal of the sensing line of the touch panel 10. A non-inverting input terminal of the operational amplifier 121a is coupled to the common voltage Vref. An output terminal of the operational amplifier 121a is coupled to the DCDS circuit 122 to provide the integration result Vca1. A first terminal and a second terminal of the feedback capacitor 121b are respectively coupled to the inverting input terminal of the operational amplifier 121a and the output terminal of the operational amplifier 121a. A first terminal and a second terminal of the reset switch 121c are respectively coupled to the inverting input terminal of the operational amplifier 121a and the output terminal of the operational amplifier 121a. A control terminal of the reset switch 121c is controlled by the reset signal Reset_CA. Based on control of the reset signal Reset_CA, the reset switch 121c resets electric charge of the feedback capacitor 121b, namely, resetting the integration result Vca1, as shown in FIG. 3 and FIG. 4.

In the embodiment shown in FIG. 2, the DCDS circuit 122 includes a switch 122a, a switch 122b, a switch 122c, a switch 122d, and a sampling capacitor 122e. A first terminal of the switch 122a is coupled to the output terminal of the reverse integrating circuit 121 to receive the integration result Vca1. A control terminal of the switch 122a is controlled by the first control signal φ1. A first terminal of the switch 122b is coupled to the reference voltage VL. A control terminal of the switch 122b is controlled by the second control signal φ2. A first end of the sampling capacitor 122e is coupled to a second terminal of the switch 122a and a second terminal of the switch 122b. A first terminal of the switch 122c is coupled to a second terminal of the sampling capacitor 122e. A second terminal of the switch 122c is coupled to the common voltage Vref. A control terminal of the switch 122c is controlled by the first control signal φ1. A first terminal of the switch 122*d* is coupled to the second terminal of the sampling capacitor 122*e*, and a second terminal of the switch 122*d* is coupled to the forward integrating circuit 123 to provide the pumping result. A control terminal of the switch 122*d* is controlled by the second control signal φ2.

Based on control of the first control signal φ1, when the switch 122*a* and the switch 122*c* are turned on and the switch 122*b* and the switch 122*d* are turned off (i.e., during the sampling period), the sampling capacitor 122*e* samples (stores) the integration result Vca1 to obtain the sampling result. Based on control of the second control signal φ2, when the switch 122*b* and the switch 122*d* are turned on and the switch 122*a* and the switch 122*c* are turned off (i.e., during the output period), the DCDS circuit 122 pumps the sampling result by using the reference voltage VL to obtain the pumping result. When the touch event does not occur (as shown in FIG. 3), since a level of the first terminal of the sampling capacitor 122*e* is identical to the level of the reference voltage VL, the sampling capacitor 122*e* does not have excessive electric charge to transfer to the forward integrating circuit 123 after the first terminal of the sampling capacitor 122*e* is switched to connect to the reference voltage VL. When the touch event occurs (as shown in FIG. 4), since the level of the first terminal of the sampling capacitor 122*e* is higher than the level of the reference voltage VL, the sampling capacitor 122*e* transfers excessive electric charge to the forward integrating circuit 123 after the first terminal of the sampling capacitor 122*e* is switched to connect to the reference voltage VL.

In the embodiment shown in FIG. 2, the forward integrating circuit 123 includes an operational amplifier 123*a*, a feedback capacitor 123*b*, and a reset switch 123*c*. An inverting input terminal of the operational amplifier 123*a* is coupled to the DCDS circuit 122 to receive the pumping result. A non-inverting input terminal of the operational amplifier 123*a* is coupled to the common voltage Vref. An output terminal of the operational amplifier 123*a* outputs the integration result as the first end signal Sd1. A first terminal and a second terminal of the feedback capacitor 123*b* are respectively coupled to the inverting input terminal of the operational amplifier 123*a* and the output terminal of the operational amplifier 123*a*. A first terminal and a second terminal of the reset switch 123*c* are respectively coupled to the inverting input terminal of the operational amplifier 123*a* and the output terminal of the operational amplifier 123*a*. When the touch event does not occur (as shown in FIG. 3), the DCDS circuit 122 does not have excessive electric charge to transfer to the feedback capacitor 123*b*. Therefore, the forward integrating circuit 123 can maintain the level of the first end signal Sd1 in the common mode signal range of the differential signal Sdiff. For example, the forward integrating circuit 123 maintains the level of the first end signal Sd1 at the common voltage Vref. When the touch event occurs (as shown in FIG. 4), since the pumping result of the DCDS circuit 122 includes the electric charge, the level of the first end signal Sd1 is gradually pulled up until the first end signal Sd1 is reset.

In the embodiment shown in FIG. 2, the forward integrating circuit 131 includes an operational amplifier 131*a*, a feedback capacitor 131*b*, and a reset switch 131*c*. An inverting input terminal of the operational amplifier 131*a* is coupled to the fourth switch SW14 to receive the sensing signal of the sensing line of the touch panel 10. A non-inverting input terminal of the operational amplifier 131*a* is coupled to the common voltage Vref. An output terminal of the operational amplifier 131*a* is coupled to the DCDS circuit 132 to provide the integration result Vca2. A first terminal and a second terminal of the feedback capacitor 131*b* are respectively coupled to the inverting input terminal of the operational amplifier 131*a* and the output terminal of the operational amplifier 131*a*. A first terminal and a second terminal of the reset switch 131*c* are respectively coupled to the inverting input terminal of the operational amplifier 131*a* and the output terminal of the operational amplifier 131*a*. A control terminal of the reset switch 131*c* is controlled by the reset signal Reset_CA. Based on control of the reset signal Reset_CA, the reset switch 131*c* resets electric charge of the feedback capacitor 131*b*, namely, resetting the integration result Vca2.

In the embodiment shown in FIG. 2, the DCDS circuit 132 includes a switch 132*a*, a switch 132*b*, a switch 132*c*, a switch 132*d*, and a sampling capacitor 132*e*. A first terminal of the switch 132*a* is coupled to the output terminal of the forward integrating circuit 131 to receive the integration result Vca2. A control terminal of the switch 132*a* is controlled by the first control signal φ1. A first terminal of the switch 132*b* is coupled to the reference voltage VH. A control terminal of the switch 132*b* is controlled by the second control signal φ2. A first terminal of the sampling capacitor 132*e* is coupled to a second terminal of the switch 132*a* and a second terminal of the switch 132*b*. A first terminal of the switch 132*c* is coupled to a second terminal of the sampling capacitor 132*e*. A second terminal of the switch 132*c* is coupled to the common voltage Vref. A control terminal of the switch 132*c* is controlled by the first control signal φ1. A first terminal of the switch 132*d* is coupled to the second terminal of the sampling capacitor 132*e*. A second terminal of the switch 132*d* is coupled to the reverse integrating circuit 133 to provide the pumping result. A control terminal of the switch 132*d* is controlled by the second control signal φ2.

Based on control of the first control signal φ1, when the switch 132*a* and the switch 132*c* are turned on and the switch 132*b* and the switch 132*d* are turned off (i.e., during the sampling period), the sampling capacitor 132*e* samples (stores) the integration result Vca2 to obtain the sampling result. Based on control of the second control signal φ2, when the switch 132*b* and the switch 132*d* are turned on and the switch 132*a* and the switch 132*c* are turned off (i.e., during the output period), the DCDS circuit 132 pumps the sampling result by using the reference voltage VH to obtain the pumping result. When the touch event does not occur (as shown in FIG. 3), since a level of the first terminal of the sampling capacitor 132*e* is identical to the level of the reference voltage VH, the sampling capacitor 132*e* does not have excessive electric charge to transfer to the reverse integrating circuit 133 after the first terminal of the sampling capacitor 132*e* is switched to connect to the reference voltage VH. When the touch event occurs (as shown in FIG. 4), since the level of the first terminal of the sampling capacitor 132*e* is lower than the level of the reference voltage VH, the sampling capacitor 132*e* transfers excessive electric charge to the reverse integrating circuit 133 after the first terminal of the sampling capacitor 132*e* is switched to connect to the reference voltage VH.

In the embodiment shown in FIG. 2, the reverse integrating circuit 133 includes an operational amplifier 133*a*, a feedback capacitor 133*b*, and a reset switch 133*c*. An inverting input terminal of the operational amplifier 133*a* is coupled to the DCDS circuit 132 to receive the pumping result. A non-inverting input terminal of the operational amplifier 133*a* is coupled to the common voltage Vref. An output ternninal of the operational amplifier 133*a* outputs an integration result as the second end signal Sd2. A first terminal and a second terminal of the feedback capacitor 133b are respectively coupled to the inverting input terminal of the operational amplifier 133a and the output terminal of the operational amplifier 133a. A first terminal and a second terminal of the reset switch 133c are respectively coupled to the inverting input terminal of the operational amplifier 133a and the output terminal of the operational amplifier 133a. When the touch event does not occur (as shown in FIG. 3), the DCDS circuit 132 does not have excessive electric charge to transfer to the feedback capacitor 133b. Therefore, the reverse integrating circuit 133 can maintain the level of the second end signal Sd2 in the common mode signal range of the differential signal Sdiff. For example, the reverse integrating circuit 133 maintains the level of the second end signal Sd2 at the common voltage Vref. When the touch event occurs (as shown in FIG. 4), since the pumping result of the DCDS circuit 132 includes the electric charge, the level of the second end signal Sd2 is gradually pulled down until the second end signal Sd2 is reset.

The control terminal of the reset switch 123c and a control terminal of the reset switch 133c are both controlled by the reset signal Reset_Int. Based on control of the reset signal Reset_Int, the reset switch 123c resets electric charge of the feedback capacitor 123b, namely, resetting the first end signal Sd1. Based on control of the reset signal Reset_Int, the reset switch 133c resets electric charge of the feedback capacitor 133b, namely, resetting the second end signal Sd2. A reset cycle of the reset signal Reset_Int may be dynamically adjusted according to the design requirement (or implementation requirement). In some embodiments, if high speed operation is needed in some design requirements (or implementation requirements), the reset cycle of the reset signal Reset_Int may be dynamically adjusted to be smaller (i.e., performing resetting earlier). In some other embodiments, when the reset cycle of the reset signal Reset_Int is increased (i.e., performing resetting later), a voltage difference between the first end signal Sd1 and the second end signal Sd2 is increased to satisfy the design requirement (or implementation requirement) for a high swing amplitude and a high signal-to-noise ratio. Therefore, the touch panel driving apparatus 100 described in the present embodiment can correspondingly generate the differential signal Sdiff having a high swing amplitude and a high signal-to-noise ratio according to the detection result of the touch panel 10.

Figure 5:
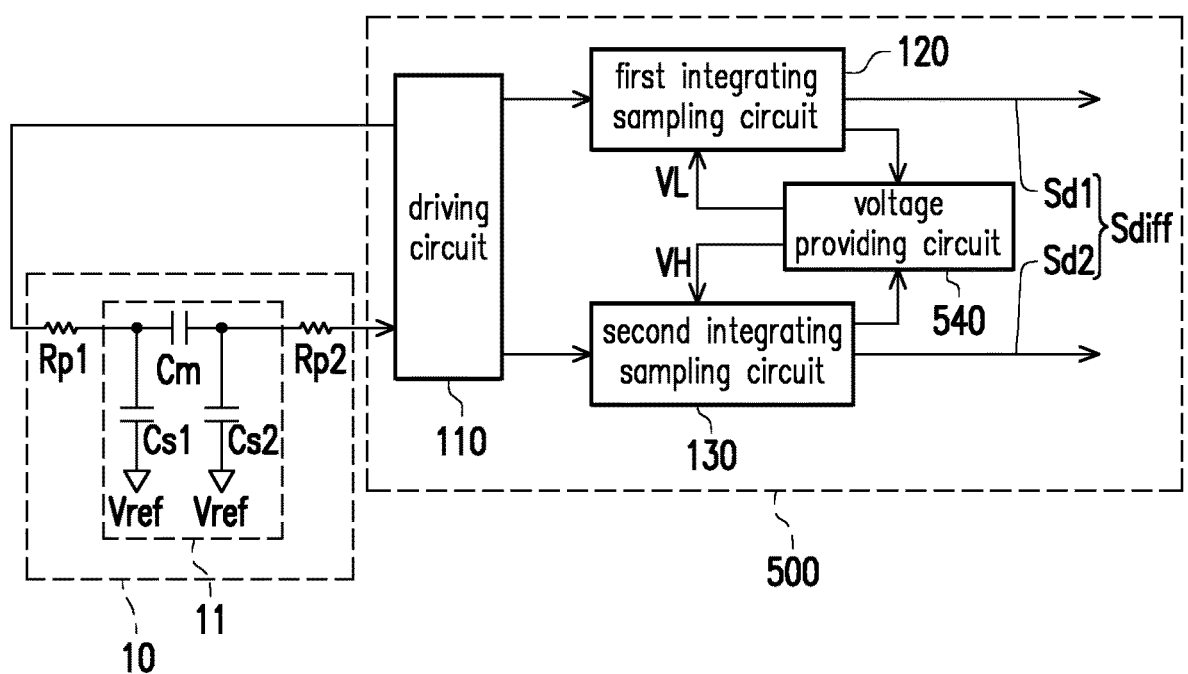
FIG. 5 is a circuit block schematic diagram illustrating a touch panel driving apparatus according to another embodiment of the disclosure.

FIG. 5 is a circuit block schematic diagram illustrating a touch panel driving apparatus 500 according to another embodiment of the disclosure. The touch panel driving apparatus 500 drives a touch panel 10 to generate a differential signal Sdiff corresponding to a detection result of the touch panel 10. The touch panel driving apparatus 500 includes a driving circuit 110, a first integrating sampling circuit 120, a second integrating sampling circuit 130, and a voltage providing circuit 540. Reference may be made to relevant descriptions of the touch panel 10, the touch panel driving apparatus 100, the driving circuit 110, the first integrating sampling circuit 120, and the second integrating sampling circuit 130 shown in FIG. 1 to FIG. 4 to infer the touch panel 10, the touch panel driving apparatus 500, the driving circuit 110, the first integrating sampling circuit 120, and the second integrating sampling circuit 130 shown in FIG. 5, which shall not be repeatedly described here.

In the embodiment shown in FIG. 5, the voltage providing circuit 540 is coupled to the first integrating sampling circuit 120 to receive a first representative voltage. The voltage providing circuit 540 is coupled to the second integrating sampling circuit 130 to receive a second representative voltage. According to the first representative voltage and the second representative voltage, the voltage providing circuit 540 correspondingly generates a reference voltage VL and a reference voltage VH. The reference voltage VL is provided to the DCDS circuit in the first integrating sampling circuit 120. The reference voltage VH is provided to the DCDS circuit in the second integrating sampling circuit 130.

Figure 6:
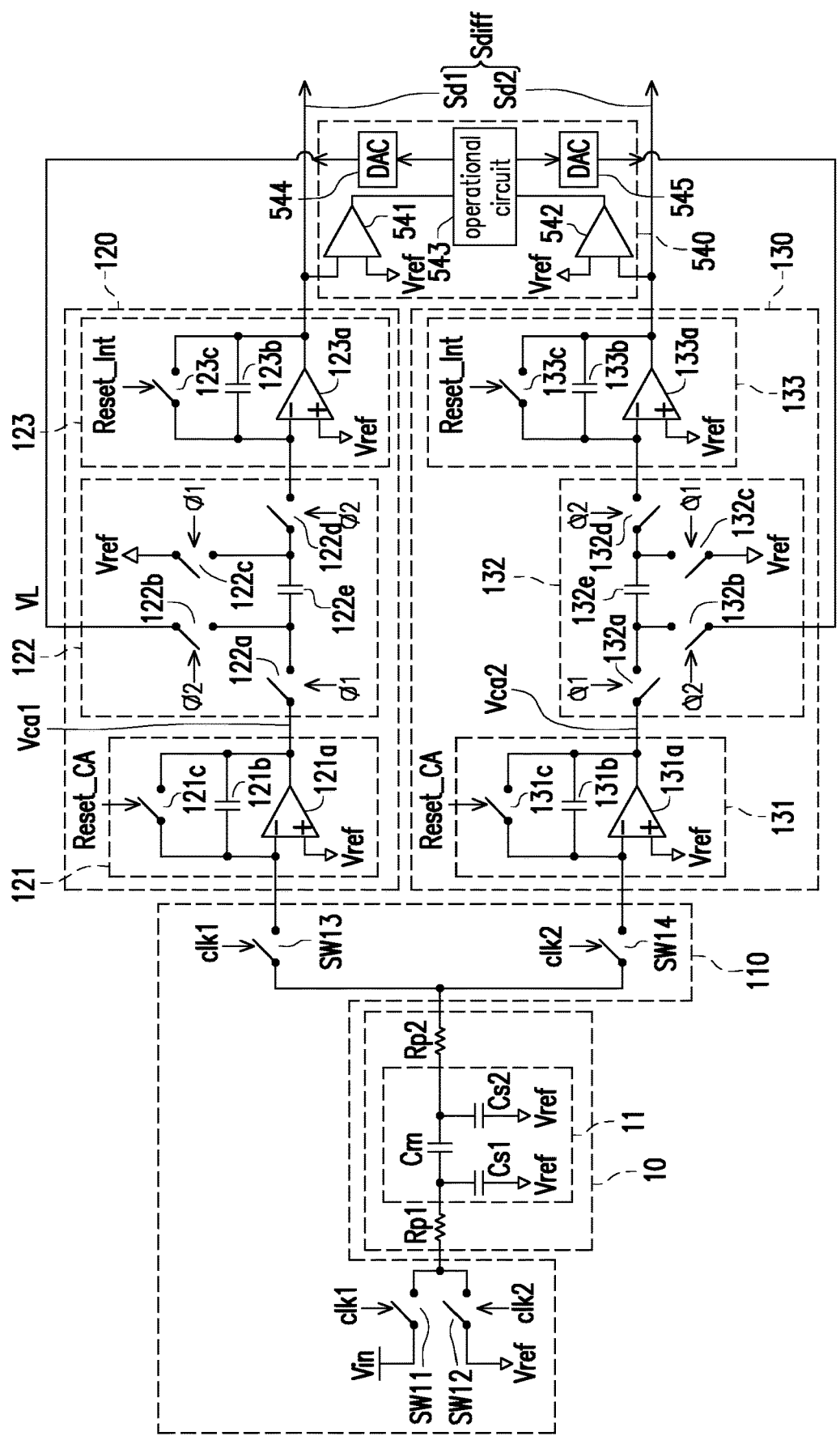
FIG. 6 is a circuit block schematic diagram illustrating the touch panel driving apparatus shown in FIG. 5 according to an embodiment of the disclosure.

FIG. 6 is a circuit block schematic diagram illustrating the touch panel driving apparatus 500 shown in FIG. 5 according to an embodiment of the disclosure. In the embodiment shown in FIG. 6, the first integrating sampling circuit 120 includes a reverse integrating circuit 121, a DCDS circuit 122, and a forward integrating circuit 123. The second integrating sampling circuit 130 includes a forward integrating circuit 131, a DCDS circuit 132, and a reverse integrating circuit 133. Reference may be made to the relevant descriptions of FIG. 1 to FIG. 4 to infer the reverse integrating circuit 121, the DCDS circuit 122, the forward integrating circuit 123, the forward integrating circuit 131, the DCDS circuit 132, and the reverse integrating circuit 133 shown in FIG. 6, which shall not be repeatedly described here. In the embodiment shown in FIG. 6, the first end signal Sd1 in FIG. 2 is used as the first representative voltage, and the second end signal Sd2 in FIG. 2 is used as the second representative voltage.

In the embodiment shown in FIG. 6, the voltage providing circuit 540 includes a first comparator 541, a second comparator 542, an operational circuit 543, a first digital analog converter (DAC) 544, and a second DAC 545. A first input terminal of the first comparator 541 is coupled to the first integrating sampling circuit 120 to receive the first representative voltage (i.e., the first end signal Sd1). A second input terminal of the first comparator 541 is coupled to the common voltage Vref. The first comparator 541 compares the first end signal Sd1 and the common voltage Vref to obtain a first comparison result. An output terminal of the first comparator 541 outputs the first comparison result. A first input terminal of the second comparator 542 is coupled to the second integrating sampling circuit 130 to receive the second representative voltage (i.e., the second end signal Sd2). A second input terminal of the second comparator 542 is coupled to the common voltage Vref. The second comparator 542 compares the second end signal Sd2 and the common voltage Vref to obtain a second comparison result. An output terminal of the second comparator 542 outputs the second comparison result.

The operational circuit 543 is coupled to the first comparator 541 to receive the first comparison result. The operational circuit 543 is coupled to the second comparator 542 to receive the second comparison result. In some embodiments, the operational circuit 543 performs an algorithm according to the first comparison result and the second comparison result to calculate a first voltage value and a second voltage value. In some other embodiments, the operational circuit 543 finds the first voltage value and the second voltage value in a lookup table according to the first comparison result and the second comparison result. The algorithm or the lookup table may be set according to the design requirement.

The first DAC 544 is coupled to the operational circuit 543 to receive the first voltage value. The first DAC 544 converts the first voltage value into the reference voltage VL and outputs the reference voltage VL to the DCDS circuit 122 in the first integrating sampling circuit 120. The operational circuit 543 may set the reference voltage VL as a "first untouched level", such that when the touch event does not occur on the touch panel 10 (as shown in FIG. 3), the DCDS circuit 122 does not have excessive electric charge to transfer to the forward integrating circuit 123, which causes the level of the first end signal Sd1 outputted by the forward integrating circuit 123 to be maintained in the common mode signal range of the differential signal Sdiff (e.g., being maintained at the common voltage Vref). The first comparator 541 maintains stability of the reference voltage VL.

The second DAC 545 is coupled to the operational circuit 543 to receive the second voltage value. The second DAC 545 converts the second voltage value into the reference voltage VH and outputs the reference voltage VH to the DCDS circuit 132 in the second integrating sampling circuit 130. The operational circuit 543 may set the reference voltage VH as a "second untouched level", such that when the touch event does not occur on the touch panel 10 (as shown in FIG. 3), the DCDS circuit 132 does not have excessive electric charge to transfer to the reverse integrating circuit 133, which causes the level of the second end signal Sd2 outputted by the reverse integrating circuit 133 to be maintained in the common mode signal range of the differential signal Sdiff (e.g., being maintained at the common voltage Vref). The second comparator 542 maintains stability of the reference voltage VH.

Figure 7:
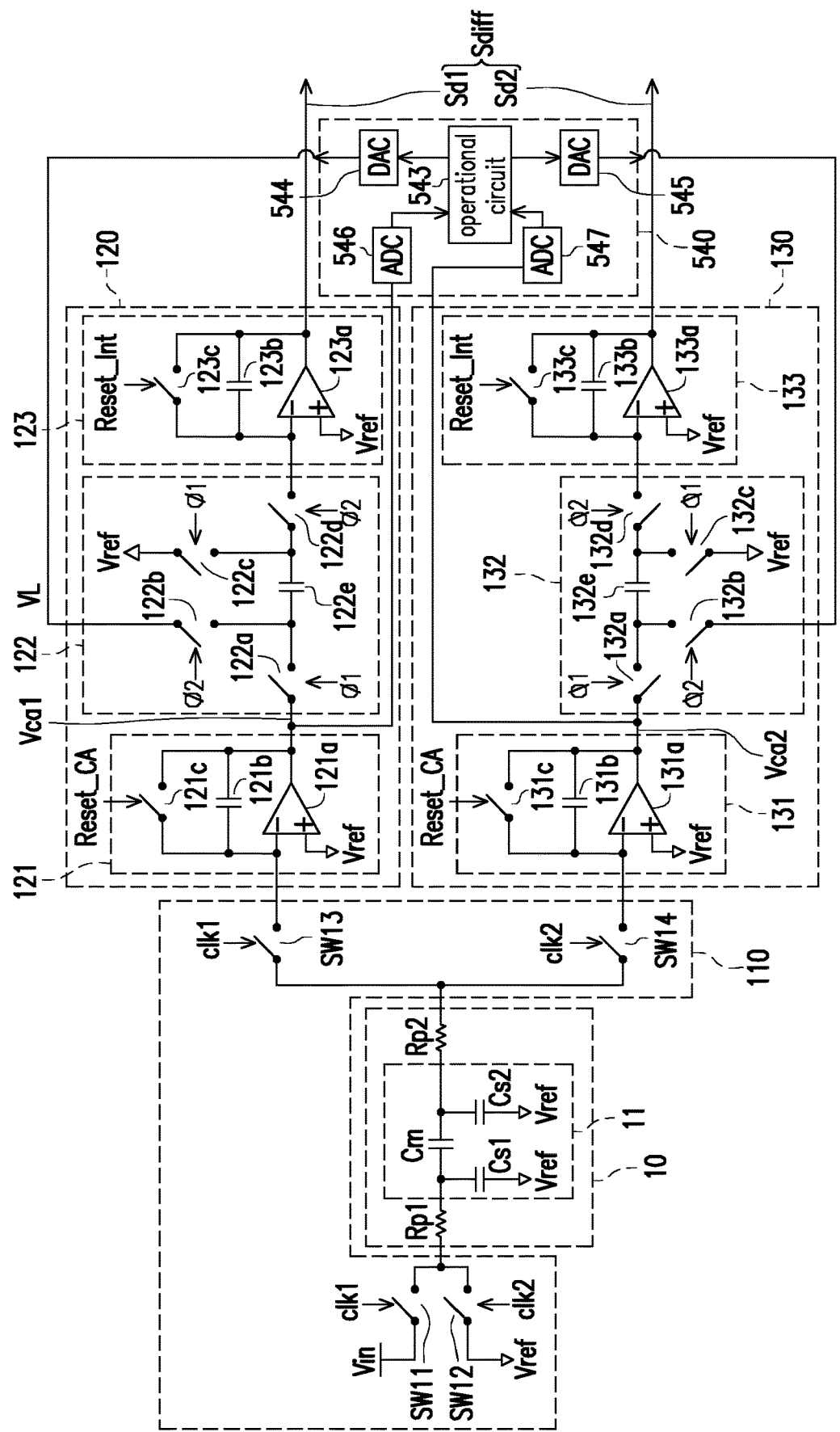
FIG. 7 is a circuit block schematic diagram illustrating the touch panel driving apparatus shown in FIG. 5 according to another embodiment of the disclosure.

FIG. 7 is a circuit block schematic diagram illustrating the touch panel driving apparatus 500 shown in FIG. 5 according to another embodiment of the disclosure. In the embodiment shown in FIG. 7, the first integrating sampling circuit 120 includes a reverse integrating circuit 121, a DCDS circuit 122, and a forward integrating circuit 123. The second integrating sampling circuit 130 includes a forward integrating circuit 131, a DCDS circuit 132, and a reverse integrating circuit 133. Reference may be made to the relevant descriptions of FIG. 1 to FIG. 4 to infer the reverse integrating circuit 121, the DCDS circuit 122, the forward integrating circuit 123, the forward integrating circuit 131, the DCDS circuit 132, and the reverse integrating circuit 133 shown in FIG. 7, which shall not be repeatedly described here. In the embodiment shown in FIG. 7, the integration result Vca1 outputted by the reverse integrating circuit 121 in the first integrating sampling circuit 120 is used as the first representative voltage of the first integrating sampling circuit 120, and the integration result Vca2 outputted by the forward integrating circuit 131 in the second integrating sampling circuit 130 is used as the second representative voltage of the second integrating sampling circuit 130.

In the embodiment shown in FIG. 7, the voltage providing circuit 540 includes a first analog digital converter (ADC) 546, a second ADC 547, an operational circuit 543, a first DAC 544, and a second DAC 545. An input terminal of the first ADC 546 is coupled to the output terminal of the reverse integrating circuit 121 in the first integrating sampling circuit 120 to receive the first representative voltage (i.e., the integration result Vca1). An output terminal of the first ADC 546 outputs a first voltage value. An input terminal of the second ADC 547 is coupled to the output terminal of the forward integrating circuit 131 in the second integrating sampling circuit 130 to receive the second representative voltage (i.e., the integration result Vca2). An output terminal of the second ADC 547 outputs a second voltage value.

The operational circuit 543 is coupled to the first ADC 546 to receive the first voltage value. The operational circuit 543 is coupled to the second ADC 547 to receive the second voltage value. In some embodiments, the operational circuit 543 performs an algorithm according to the first voltage value and the second voltage value to calculate a third voltage value and a fourth voltage value. In some other embodiments, the operational circuit 543 finds the third voltage value and the fourth voltage value in a lookup table according to the first voltage value and the second voltage value. The algorithm or the lookup table may be set according to the design requirement.

The first DAC 544 is coupled to the operational circuit 543 to receive the third voltage value. The first DAC 544 converts the third voltage value into the reference voltage VL and outputs the reference voltage VL to the DCDS circuit 122 in the first integrating sampling circuit 120. The operational circuit 543 may set the reference voltage VL as a "first untouched level", such that when the touch event does not occur on the touch panel 10 (as shown in FIG. 3), the DCDS circuit 122 does not have excessive electric charge to transfer to the forward integrating circuit 123, which causes the level of the first end signal Sd1 outputted by the forward integrating circuit 123 to be maintained in the common mode signal range of the differential signal Sdiff (e.g., being maintained at the common voltage Vref). The voltage providing circuit 540 maintains stability of the reference voltage VL by feedback.

The second DAC 545 is coupled to the operational circuit 543 to receive the fourth voltage value. The second DAC 545 converts the fourth voltage value into the reference voltage VH and outputs the reference voltage VH to the DCDS circuit 132 in the second integrating sampling circuit 130. The operational circuit 543 may set the reference voltage VH as a "second untouched level", such that when the touch event does not occur on the touch panel 10 (as shown in FIG. 3), the DCDS circuit 132 does not have excessive electric charge to transfer to the reverse integrating circuit 133, which causes the level of the second end signal Sd2 outputted by the reverse integrating circuit 133 to be maintained in the common mode signal range of the differential signal Sdiff (e.g., being maintained at the common voltage Vref). The voltage providing circuit 540 maintains stability of the reference voltage VH by feedback.

Figure 8:
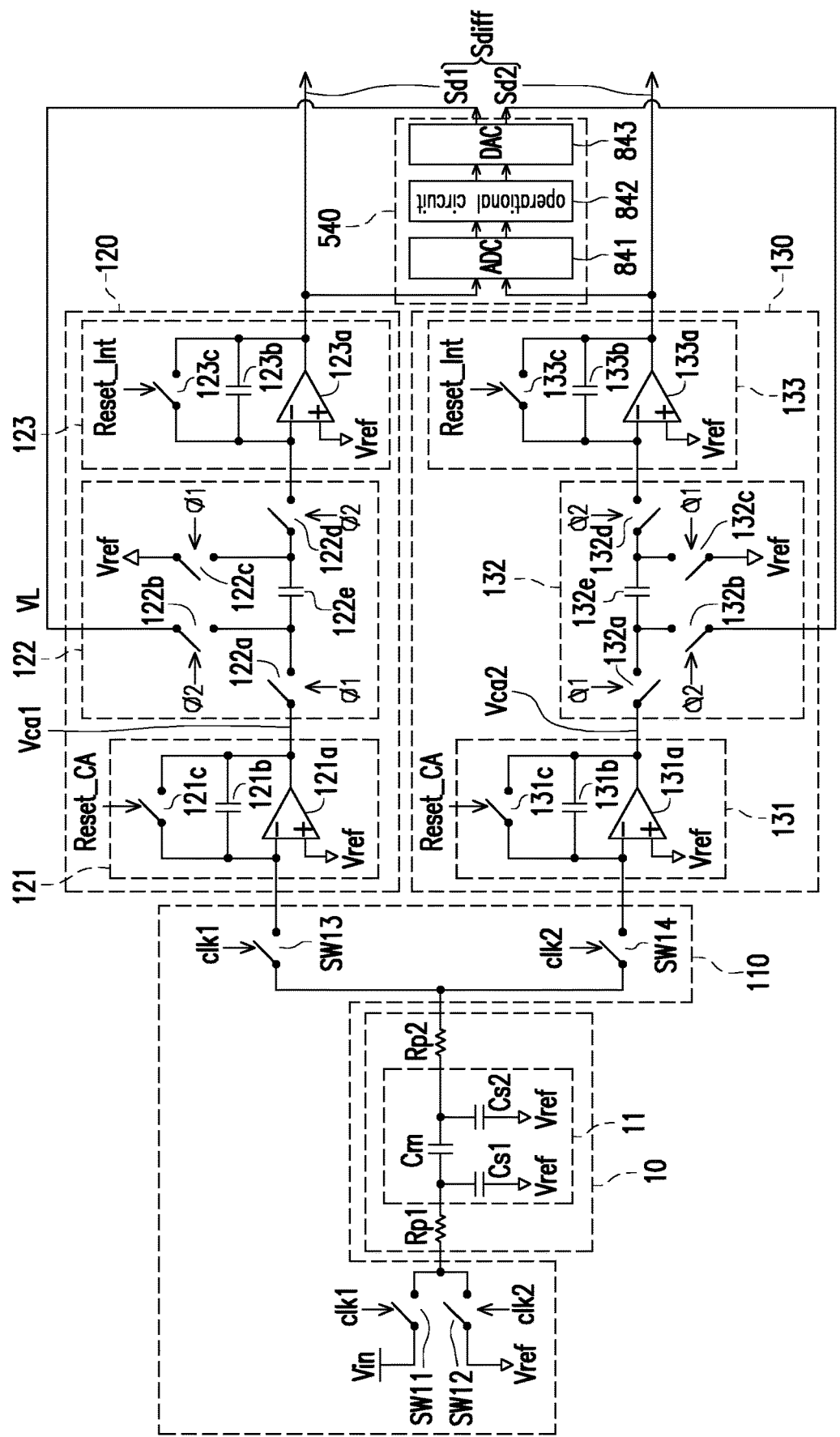
FIG. 8 is a circuit block schematic diagram illustrating the touch panel driving apparatus shown in FIG. 5 according to another embodiment of the disclosure.

FIG. 8 is a circuit block schematic diagram illustrating the touch panel driving apparatus 500 shown in FIG. 5 according to another embodiment of the disclosure. In the embodiment shown in FIG. 8, the first integrating sampling circuit 120 includes a reverse integrating circuit 121, a DCDS circuit 122, and a forward integrating circuit 123. The second integrating sampling circuit 130 includes a forward integrating circuit 131, a DCDS circuit 132, and a reverse integrating circuit 133. Reference may be made to the relevant descriptions of FIG. 1 to FIG. 4 to infer the reverse integrating circuit 121, the DCDS circuit 122, the forward integrating circuit 123, the forward integrating circuit 131, the DCDS circuit 132, and the reverse integrating circuit 133 shown in FIG. 8, which shall not be repeatedly described here. In the embodiment shown in FIG. 8, the first end signal Sd1 in FIG. 2 is used as the first representative voltage, and the second end signal Sd2 in FIG. 2 is used as the second representative voltage.

In the embodiment shown in FIG. 8, the voltage providing circuit 540 includes an analog digital converter (ADC) 841, an operational circuit 842, and a digital analog converter (DAC) 843. The analogue digital converter 841 is coupled to the first integrating sampling circuit 120 to receive the first representative voltage (i.e., the first end signal Sd1). The analogue digital converter 841 is coupled to the second integrating sampling circuit 130 to receive the second representative voltage (i.e., the second end signal Sd2). The ADC 841 converts the first representative voltage (i.e., the first end signal Sd1) into a first voltage value and converts the second representative voltage (i.e., the second end signal Sd2) into a second voltage value.

The operational circuit 842 is coupled to the ADC 841 to receive the first voltage value and the second voltage value. In some embodiments, the operational circuit 842 performs an algorithm according to the first voltage value and the second voltage value to calculate a third voltage value and a fourth voltage value. In some other embodiments, the operational circuit 842 finds the third voltage value and the fourth voltage value in a lookup table according to the first voltage value and the second voltage value. The algorithm or the lookup table may be set according to the design requirement.

The DAC 843 is coupled to the operational circuit 842 to receive the third voltage value and the fourth voltage value. The DAC 843 converts the third voltage value into the reference voltage VL and outputs the reference voltage VL to the DCDS circuit 122 in the first integrating sampling circuit 120. The operational circuit 842 may set the reference voltage VL as a "first untouched level", such that when the touch event does not occur on the touch panel 10 (as shown in FIG. 3), the DCDS circuit 122 does not have excessive electric charge to transfer to the forward integrating circuit 123, which causes the level of the first end signal Sd1 outputted by the forward integrating circuit 123 to be maintained in the common mode signal range of the differential signal Sdiff (e.g., being maintained at the common voltage Vref). The voltage providing circuit 540 maintains stability of the reference voltage VL by feedback.

The DAC 843 further converts the fourth voltage value into the reference voltage VH and outputs the reference voltage VH to the DCDS circuit 132 in the second integrating sampling circuit 130. The operational circuit 842 may set the reference voltage VH as a "second untouched level", such that when the touch event does not occur on the touch panel 10 (as shown in FIG. 3), the DCDS circuit 132 does not have excessive electric charge to transfer to the reverse integrating circuit 133, which causes the level of the second end signal Sd2 outputted by the reverse integrating circuit 133 to be maintained in the common mode signal range of the differential signal Sdiff (e.g., being maintained at the common voltage Vref). The voltage providing circuit 540 maintains stability of the reference voltage VH by feedback.

Figure 9:
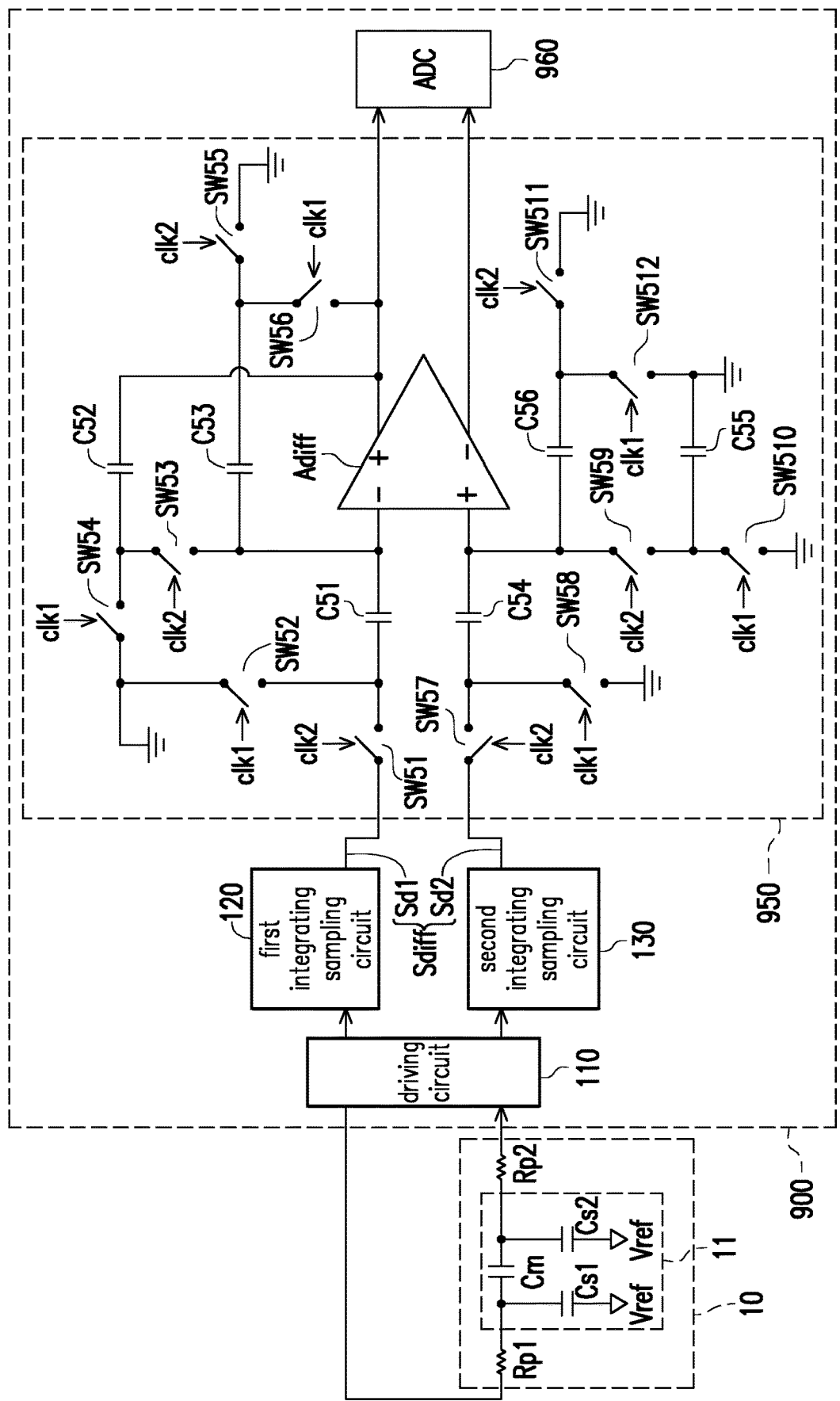
FIG. 9 is a circuit block schematic diagram illustrating a touch panel driving apparatus according to another embodiment of the disclosure.

FIG. 9 is a circuit block schematic diagram illustrating a touch panel driving apparatus 900 according to another embodiment of the disclosure. The touch panel driving apparatus 900 drives a touch panel 10 to generate a differential signal Sdiff corresponding to a detection result of the touch panel 10. The touch panel driving apparatus 900 includes a driving circuit 110, a first integrating sampling circuit 120, a second integrating sampling circuit 130, a baseline compensator circuit 950, and an analog digital converter (ADC) 960. Reference may be made to the relevant descriptions of the touch panel 10, the touch panel driving apparatus 100, the driving circuit 110, the first integrating sampling circuit 120, and the second integrating sampling circuit 130 shown in FIG. 1 to FIG. 4 to infer the touch panel 10, the touch panel driving apparatus 900, the driving circuit 110, the first integrating sampling circuit 120, and the second integrating sampling circuit 130 shown in FIG. 9, which shall not be repeatedly described here.

In the embodiment shown in FIG. 9, the baseline compensator circuit 950 includes a differential input terminal pair and a differential output terminal pair. The differential input terminal pair of the baseline compensator circuit 950 is coupled to the first integrating sampling circuit 120 and the second integrating sampling circuit 130 to receive the differential signal Sdiff. The ADC 960 includes a differential input terminal pair. The differential input terminal pair of the ADC 960 is coupled to the differential output terminal pair of the baseline compensator circuit 950.

In the embodiment shown in FIG. 9, the baseline compensator circuit 950 includes a differential amplifier Adiff, a first switch SW51, a second switch SW52, a third switch SW53, a fourth switch SW54, a fifth switch SW55, a sixth switch SW56, a seventh switch SW57, an eighth switch SW58, a ninth switch SW59, a tenth switch SW510, an eleventh switch SW511, a twelfth switch SW512, a first capacitor C51, a second capacitor C52, a third capacitor C53, a fourth capacitor C54, a fifth capacitor C55, and a sixth capacitor C56. An inverting output terminal and a non-inverting output terminal of the differential amplifier Adiff are used as the differential output terminal pair of the baseline compensator circuit 950.

A first terminal of the first switch SW51 is coupled to the first integrating sampling circuit 120 to receive a first end signal Sd1 in the differential signal Sdiff. A first terminal of the seventh switch SW57 is coupled to the second integrating sampling circuit 130 to receive a second end signal Sd2 in the differential signal Sdiff. A control terminal of the first switch SW51 and a control terminal of the seventh switch SW57 are both controlled by a clock signal clk2. A control terminal of the second switch SW52 is controlled by a clock signal clk1. A first terminal of the first capacitor C51 is coupled to a second terminal of the first switch SW51. A second terminal of the first capacitor C51 is coupled to an inverting input terminal of the differential amplifier Adiff. A first terminal of the fourth capacitor C54 is coupled to a second terminal of the seventh switch SW57. A second terminal of the fourth capacitor C54 is coupled to a non-inverting input terminal of the differential amplifier Adiff.

A first terminal of the second switch SW52 is coupled to the second terminal of the first switch SW51. A second terminal of the second switch SW52 is coupled to a reference voltage (e.g., a grounding voltage). A first terminal of the third switch SW53 is coupled to the inverting input terminal of the differential amplifier Adiff. A control terminal of the third switch SW53 is controlled by the clock signal clk2. A first terminal of the fourth switch SW54 is coupled to a second terminal of the third switch SW53. A second terminal of the fourth switch SW54 is coupled to the reference voltage (e.g., a grounding voltage). A control terminal of the fourth switch SW54 is controlled by the clock signal clk1. A first terminal of the second capacitor C52 is coupled to the second terminal of the third switch SW53. A second terminal of the second capacitor C52 is coupled to the non-inverting output terminal of the differential amplifier Adiff. A first terminal of the third capacitor C53 is coupled to the inverting input terminal of the differential amplifier Adiff. A first terminal of the fifth switch SW55 is coupled to a second terminal of the third capacitor C53. A second terminal of the fifth switch SW55 is coupled to the reference voltage (e.g., a grounding voltage). A control terminal of the fifth switch SW55 is controlled by the clock signal clk2. A first terminal of the sixth switch SW56 is coupled to the second terminal of the third capacitor C53. A second terminal of the sixth switch SW56 is coupled to the non-inverting output terminal of the differential amplifier Adiff. A control terminal of the sixth switch SW56 is controlled by the clock signal clk1.

A first terminal of the eighth switch SW58 is coupled to the second terminal of the seventh switch SW57. A second terminal of the eighth switch SW58 is coupled to the reference voltage (e.g., a grounding voltage). A control terminal of the eighth switch SW58 is controlled by the clock signal clk1. A first terminal of the ninth switch SW59 is coupled to the non-inverting input terminal of the differential amplifier Adiff. A control terminal of the ninth switch SW59 is controlled by the clock signal clk2. A first terminal of the tenth switch SW510 is coupled to a second terminal of the ninth switch SW59. A second terminal of the tenth switch SW510 is coupled to the reference voltage (e.g., a grounding voltage). A control terminal of the tenth switch SW510 is controlled by the clock signal clk1. A first terminal of the fifth capacitor C55 is coupled to the second terminal of the ninth switch SW59. A second terminal of the fifth capacitor C55 is coupled to the reference voltage (e.g., a grounding voltage). A first terminal of the sixth capacitor C56 is coupled to the non-inverting input terminal of the differential amplifier Adiff. A first terminal of the eleventh switch SW511 is coupled to a second terminal of the sixth capacitor C56. A second terminal of the eleventh switch SW511 is coupled to the reference voltage (e.g., a grounding voltage). A control terminal of the eleventh switch SW511 is controlled by the clock signal clk2. A first terminal of the twelfth switch SW512 is coupled to the second terminal of the sixth capacitor C56. A second terminal of the twelfth switch SW512 is coupled to the reference voltage (e.g., a grounding voltage). A control terminal of the twelfth switch SW512 is controlled by the clock signal clk1.

In summary of the above, the touch panel driving apparatus 100, 500 or 900 described in the embodiments of the disclosure reads the sensing signal of the touch panel 10 by using two integrating sampling circuits 120 and 130. The integrating sampling circuits 120 and 130 respectively generate the first end signal Sd1 and the second end signal Sd2 in the differential signal Sdiff. When the touch event does not occur on the touch panel 10, the levels of the first end signal Sd1 and the second end signal Sd2 are in the common mode signal range of the differential signal Sdiff. For example, the levels of the first end signal Sd1 and the second end signal Sd2 are maintained at the common voltage Vref. When the touch event occurs on the touch panel 10, the first integrating sampling circuit 120 pulls up the level of the first end signal Sd1 out of the common mode signal range, and the second integrating sampling circuit 130 pulls down the level of the second end signal Sd2 out of the common mode signal range. Therefore, the touch panel driving apparatus 100, 500, or 900 described in the embodiments of the disclosure can correspondingly generate the differential signal Sdiff having a high swing amplitude and a high signal-to-noise ratio according to the detection result of the touch panel 10. With the signal characteristics of a high swing amplitude and a high signal-to-noise ratio, the touch panel driving apparatus described in the embodiments of the disclosure can solve a disturbance issue caused by an overly small gap between the touch panel 10 and a bottom plate (e.g., a display panel).

Although the embodiments are already disclosed as above, these embodiments should not be construed as limitations on the scope of the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch panel driving apparatus, configured to drive a touch panel to generate a differential signal corresponding to a detection result of the touch panel, the touch panel driving apparatus comprising:

a driving circuit, providing a first driving signal to a driving line of the touch panel and receive a sensing signal from a sensing line of the touch panel during a first clock period, and provide a second driving signal to the driving line and receive the sensing signal from the sensing line during a second clock period;

a first integrating sampling circuit, coupled to the driving circuit to receive the sensing signal during the first clock period, and generating a first end signal of the differential signal, wherein a level of the first end signal is in a common mode signal range of the differential signal when a sensing electrode of the sensing line does not detect a touch event, and the first integrating sampling circuit pulls up the level of the first end signal out of the common mode signal range according to the sensing signal when the sensing electrode of the sensing line detects the touch event; and a second integrating sampling circuit, coupled to the driving circuit to receive the sensing signal during the second clock period, and generating a second end signal of the differential signal, wherein a level of the second end signal is in the common mode signal range when the sensing electrode of the sensing line does not detect the touch event, and the second integrating sampling circuit pulls down the level of the second end signal out of the common mode signal range according to the sensing signal when the sensing electrode of the sensing line detects the touch event.

2. The touch panel driving apparatus according to claim 1, wherein the driving circuit comprises:

a first switch, configured to transmit the first driving signal to the driving line of the touch panel during the first clock period and not to transmit the first driving signal during the second clock period;

a second switch, configured to transmit the second driving signal to the driving line of the touch panel during the second clock period and not to transmit the second driving signal during the first clock period;

a third switch, coupled to the first integrating sampling circuit, and configured to transmit the sensing signal of the sensing line of the touch panel to the first integrating sampling circuit during the first clock period and not to transmit the sensing signal during the second clock period; and a fourth switch, coupled to the second integrating sampling circuit, and configured to transmit the sensing signal of the sensing line of the touch panel to the second integrating sampling circuit during the second clock period and not to transmit the sensing signal during the first clock period.

3. The touch panel driving apparatus according to claim 2, wherein the first integrating sampling circuit comprises:

a reverse integrating circuit, coupled to the third switch to receive the sensing signal, and performing a reverse integrating operation on the sensing signal to output a first integration result;

a delta-adding correlated double sampling circuit, coupled to an output terminal of the reverse integrating circuit to receive the first integration result, and sampling the first integration result during a sampling period to obtain a sampling result, and pumping the sampling result by using a reference voltage during an output period to obtain a pumping result; and a forward integrating circuit, coupled to an output terminal of the delta-adding correlated double sampling circuit to receive the pumping result, and performing a forward integrating operation on the pumping result to output a second integration result as the first end signal.

4. The touch panel driving apparatus according to claim 3, wherein a level of the sampling result is an untouched level when the sensing electrode of the sensing line does not detect the touch event, and a level of the reference voltage is set as the untouched level.

5. The touch panel driving apparatus according to claim 3, wherein the reverse integrating circuit comprises:
- an operational amplifier comprising an inverting input terminal, a non-inverting input terminal, and an output terminal, wherein the inverting input terminal is coupled to the third switch to receive the sensing signal, the non-inverting input terminal is coupled to a common voltage, and the output terminal of the operational amplifier is coupled to the delta-adding correlated double sampling circuit to provide the first integration result;
- a feedback capacitor comprising a first terminal and a second terminal respectively coupled to the inverting input terminal and the output terminal of the operational amplifier; and
- a reset switch comprising a first terminal and a second terminal respectively coupled to the inverting input terminal and the output terminal of the operational amplifier.

6. The touch panel driving apparatus according to claim 3, wherein the delta-adding correlated double sampling circuit comprises:
- a fifth switch comprising a first terminal, a second terminal, and a control terminal, wherein the first terminal of the fifth switch is coupled to the output terminal of the reverse integrating circuit to receive the first integration result, and the control terminal of the fifth switch is controlled by a first control signal;
- a sixth switch comprising a first terminal, a second terminal, and a control terminal, wherein the first terminal of the sixth switch is coupled to the reference voltage, and the control terminal of the sixth switch is controlled by a second control signal;
- a sampling capacitor comprising a first terminal coupled to the second terminal of the fifth switch and the second terminal of the sixth switch;
- a seventh switch comprising a first terminal, a second terminal, and a control terminal, wherein the first terminal of the seventh switch is coupled to a second terminal of the sampling capacitor, the second terminal of the seventh switch is coupled to a common voltage, and the control terminal of the seventh switch is controlled by the first control signal; and
- an eighth switch comprising a first terminal, a second terminal, and a control terminal, wherein the first terminal of the eighth switch is coupled to the second terminal of the sampling capacitor, the second terminal of the eighth switch is coupled to the forward integrating circuit to provide the pumping result, and the control terminal of the eighth switch is controlled by the second control signal.

7. The touch panel driving apparatus according to claim 3, wherein the forward integrating circuit comprises:
- an operational amplifier comprising an inverting input terminal, a non-inverting input terminal, and an output terminal, wherein the inverting input terminal is coupled to the delta-adding con-elated double sampling circuit to receive the pumping result, the non-inverting input terminal is coupled to a common voltage, and the output terminal of the operational amplifier outputs the second integration result as the first end signal;
- a feedback capacitor comprising a first terminal and a second terminal respectively coupled to the inverting input terminal and the output terminal of the operational amplifier; and
- a reset switch comprising a first terminal and a second terminal respectively coupled to the inverting input terminal and the output terminal of the operational amplifier.

8. The touch panel driving apparatus according to claim 2, wherein the second integrating sampling circuit comprises:
- a forward integrating circuit, coupled to the fourth switch to receive the sensing signal, and performing a forward integrating operation on the sensing signal to output a first integration result;
- a delta-adding correlated double sampling circuit, coupled to an output terminal of the forward integrating circuit to receive the first integration result, and sampling the first integration result during a sampling period to obtain a sampling result, and pumping the sampling result by using a reference voltage during an output period to obtain a pumping result; and
- a reverse integrating circuit, coupled to an output terminal of the delta-adding correlated double sampling circuit to receive the pumping result, and performing a reverse integrating operation on the pumping result to output a second integration result as the second end signal.

9. The touch panel driving apparatus according to claim 8, wherein a level of the sampling result is an untouched level when the sensing electrode of the sensing line does not detect the touch event, and a level of the reference voltage is set as the untouched level.

10. The touch panel driving apparatus according to claim 8, wherein the forward integrating circuit comprises:
- an operational amplifier comprising an inverting input terminal, a non-inverting input terminal, and an output terminal, wherein the inverting input terminal is coupled to the fourth switch to receive the sensing signal, the non-inverting input terminal is coupled to a common voltage, and the output terminal of the operational amplifier is coupled to the delta-adding correlated double sampling circuit to provide the first integration result;
- a feedback capacitor comprising a first terminal and a second terminal respectively coupled to the inverting input terminal and the output terminal of the operational amplifier; and
- a reset switch comprising a first terminal and a second terminal respectively coupled to the inverting input terminal and the output terminal of the operational amplifier.

11. The touch panel driving apparatus according to claim 8, wherein the delta-adding correlated double sampling circuit comprises:
- a fifth switch comprising a first terminal, a second terminal, and a control terminal, wherein the first terminal of the fifth switch is coupled to the output terminal of the forward integrating circuit to receive the first integration result, and the control terminal of the fifth switch is controlled by a first control signal;
- a sixth switch comprising a first terminal, a second terminal, and a control terminal, wherein the first terminal of the sixth switch is coupled to the reference voltage, and the control terminal of the sixth switch is controlled by a second control signal;

a sampling capacitor comprising a first terminal coupled to the second terminal of the fifth switch and the second terminal of the sixth switch;

a seventh switch comprising a first terminal, a second terminal, and a control terminal, wherein the first terminal of the seventh switch is coupled to a second terminal of the sampling capacitor, the second terminal of the seventh switch is coupled to a common voltage, and the control terminal of the seventh switch is controlled by the first control signal; and an eighth switch comprising a first terminal, a second terminal, and a control terminal, wherein the first terminal of the eighth switch is coupled to the second terminal of the sampling capacitor, the second terminal of the eighth switch is coupled to the reverse integrating circuit to provide the pumping result, and the control terminal of the eighth switch is controlled by the second control signal.

12. The touch panel driving apparatus according to claim 8, wherein the reverse integrating circuit comprises:

an operational amplifier comprising an inverting input terminal, a non-inverting input terminal, and an output terminal, wherein the inverting input terminal is coupled to the delta-adding correlated double sampling circuit to receive the pumping result, the non-inverting input terminal is coupled to a common voltage, and the output terminal of the operational amplifier outputs the second integration result as the second end signal;

a feedback capacitor comprising a first terminal and a second terminal respectively coupled to the inverting input terminal and the output terminal of the operational amplifier; and a reset switch comprising a first terminal and a second terminal respectively coupled to the inverting input terminal and the output terminal of the operational amplifier.

13. The touch panel driving apparatus according to claim 1, further comprising:

a voltage providing circuit, coupled to the first integrating sampling circuit to receive a first representative voltage, coupled to the second integrating sampling circuit to receive a second representative voltage, and correspondingly generating a first reference voltage and a second reference voltage according to the first representative voltage and the second representative voltage, wherein the first reference voltage is provided to a first delta-adding correlated double sampling circuit in the first integrating sampling circuit, and the second reference voltage is provided to a second delta-adding correlated double sampling circuit in the second integrating sampling circuit.

14. The touch panel driving apparatus according to claim 13, wherein the first representative voltage is the first end signal, and the second representative voltage is the second end signal.

15. The touch panel driving apparatus according to claim 14, wherein the voltage providing circuit comprises:

a first comparator comprising a first input terminal, a second input terminal, and an output terminal, wherein the first input terminal of the first comparator is coupled to the first integrating sampling circuit to receive the first representative voltage, the second input terminal of the first comparator is coupled to a common voltage, and the output terminal of the first comparator outputs a first comparison result;

a second comparator comprising a first input terminal, a second input terminal, and an output terminal, wherein the first input terminal of the second comparator is coupled to the second integrating sampling circuit to receive the second representative voltage, the second input terminal of the second comparator is coupled to the common voltage, and the output terminal of the second comparator outputs a second comparison result;

an operational circuit, coupled to the first comparator to receive the first comparison result, coupled to the second comparator to receive the second comparison result, and calculating a first voltage value and a second voltage value according to the first comparison result and the second comparison result;

a first digital analog converter, coupled to the operational circuit to receive the first voltage value, and converting the first voltage value into the first reference voltage and outputting the first reference voltage to the first delta-adding correlated double sampling circuit in the first integrating sampling circuit; and a second digital analog converter, coupled to the operational circuit to receive the second voltage value, and converting the second voltage value into the second reference voltage and outputting the second reference voltage to the second delta-adding correlated double sampling circuit in the second integrating sampling circuit.

16. The touch panel driving apparatus according to claim 14, wherein the voltage providing circuit comprises:

an analog digital converter, coupled to the first integrating sampling circuit to receive the first representative voltage, and coupled to the second integrating sampling circuit to receive the second representative voltage, wherein the analog digital converter converts the first representative voltage into a first voltage value, and the analog digital converter converts the second representative voltage into a second voltage value;

an operational circuit, coupled to the analog digital converter to receive the first voltage value and the second voltage value, and calculating a third voltage value and a fourth voltage value according to the first voltage value and the second voltage value; and a digital analog converter, coupled to the operational circuit to receive the third voltage value and the fourth voltage value, and converting the third voltage value into the first reference voltage, and outputting the first reference voltage to the first delta-adding correlated double sampling circuit in the first integrating sampling circuit, and converting the fourth voltage value into the second reference voltage, and outputting the second reference voltage to the second delta-adding correlated double sampling circuit in the second integrating sampling circuit.

17. The touch panel driving apparatus according to claim 13, wherein the first representative voltage is a first integration result outputted by a reverse integrating circuit in the first integrating sampling circuit, and the second representative voltage is a second integration result outputted by a forward integrating circuit in the second integrating sampling circuit.

18. The touch panel driving apparatus according to claim 17, wherein the voltage providing circuit comprises:

a first analog digital converter comprising an input terminal and an output terminal, wherein the input terminal of the first analog digital converter is coupled to an output terminal of the reverse integrating circuit in the first integrating sampling circuit to receive the first representative voltage, and the output terminal of the first analog digital converter outputs a first voltage value;

a second analog digital converter comprising an input terminal and an output terminal, wherein the input terminal of the second analog digital converter is coupled to an output terminal of the forward integrating circuit in the second integrating sampling circuit to receive the second representative voltage, and the output terminal of the second analog digital converter outputs a second voltage value;

an operational circuit, coupled to the first analog digital converter to receive the first voltage value, coupled to the second analog digital converter to receive the second voltage value, and calculating a third voltage value and a fourth voltage value according to the first voltage value and the second voltage value;

a first digital analog converter, coupled to the operational circuit to receive the third voltage value, and converting the third voltage value into the first reference voltage, and outputting the first reference voltage to the first delta-adding correlated double sampling circuit in the first integrating sampling circuit; and a second digital analog converter, coupled to the operational circuit to receive the fourth voltage value, and converting the fourth voltage value into the second reference voltage, and outputting the second reference voltage to the second delta-adding correlated double sampling circuit in the second integrating sampling circuit.

19. The touch panel driving apparatus according to claim 1, further comprising:

a baseline compensator circuit comprising a differential input terminal pair and a differential output terminal pair, wherein the differential input terminal pair of the baseline compensator circuit is coupled to the first integrating sampling circuit and the second integrating sampling circuit to receive the differential signal; and an analog digital converter comprising a differential input terminal pair, wherein the differential input terminal pair of the analog digital converter is coupled to the differential output terminal pair of the baseline compensator circuit.

20. The touch panel driving apparatus according to claim 19, wherein the baseline compensator circuit comprises:

a first switch comprising a first terminal, a second terminal, and a control terminal, wherein the first terminal of the first switch is coupled to the first integrating sampling circuit to receive the first terminal signal of the differential signal, and the control terminal of the first switch is controlled by a first clock signal;

a second switch comprising a first terminal, a second terminal, and a control terminal, wherein the first terminal of the second switch is coupled to the second terminal of the first switch, the second terminal of the second switch is coupled to a reference voltage, and the control terminal of the second switch is controlled by a second clock signal;

a first capacitor comprising a first terminal and a second terminal, wherein the first terminal of the first capacitor is coupled to the second terminal of the first switch;

a differential amplifier comprising an inverting input terminal, a non-inverting input terminal, an inverting output terminal, and a non-inverting output terminal, wherein the inverting input terminal of the differential amplifier is coupled to the second terminal of the first capacitor, and the inverting output terminal and the non-inverting output terminal of the differential amplifier are used as the differential output terminal pair of the baseline compensator circuit;

a third switch comprising a first terminal, a second terminal, and a control terminal, wherein the first terminal of the third switch is coupled to the inverting input terminal of the differential amplifier, and the control terminal of the third switch is controlled by the first clock signal;

a fourth switch comprising a first terminal, a second terminal, and a control terminal, wherein the first terminal of the fourth switch is coupled to the second terminal of the third switch, the second terminal of the fourth switch is coupled to the reference voltage, and the control terminal of the fourth switch is controlled by the second clock signal;

a second capacitor comprising a first terminal and a second terminal, wherein the first terminal of the second capacitor is coupled to the second terminal of the third switch, and the second terminal of the second capacitor is coupled to the non-inverting output terminal of the differential amplifier;

a third capacitor comprising a first terminal and a second terminal, wherein the first terminal of the third capacitor is coupled to the inverting input terminal of the differential amplifier;

a fifth switch comprising a first terminal, a second terminal, and a control terminal, wherein the first terminal of the fifth switch is coupled to the second terminal of the third capacitor, the second terminal of the fifth switch is coupled to the reference voltage, and the control terminal of the fifth switch is controlled by the first clock signal;

a sixth switch comprising a first terminal, a second terminal, and a control terminal, wherein the first terminal of the sixth switch is coupled to the second terminal of the third capacitor, the second terminal of the sixth switch is coupled to the non-inverting output terminal of the differential amplifier, and the control terminal of the sixth switch is controlled by the second clock signal;

a seventh switch comprising a first terminal, a second terminal, and a control terminal, wherein the first terminal of the seventh switch is coupled to the second integrating sampling circuit to receive the second end signal of the differential signal, and the control terminal of the seventh switch is controlled by the first clock signal;

an eighth switch comprising a first terminal, a second terminal, and a control terminal, wherein the first terminal of the eighth switch is coupled to the second terminal of the seventh switch, the second terminal of the eighth switch is coupled to the reference voltage, and the control terminal of the eighth switch is controlled by the second clock signal;

a fourth capacitor comprising a first terminal and a second terminal, wherein the first terminal of the fourth capacitor is coupled to the second terminal of the seventh switch, and the second terminal of the fourth capacitor is coupled to the non-inverting input terminal of the differential amplifier;

a ninth switch comprising a first terminal, a second terminal, and a control terminal, wherein the first terminal of the ninth switch is coupled to the non-inverting input terminal of the differential amplifier, and the control terminal of the ninth switch is controlled by the first clock signal;

a tenth switch comprising a first terminal, a second terminal, and a control terminal, wherein the first terminal of the tenth switch is coupled to the second terminal of the ninth switch, the second terminal of the tenth switch is coupled to the reference voltage, and the control terminal of the tenth switch is controlled by the second clock signal;

a fifth capacitor comprising a first terminal and a second terminal, wherein the first terminal of the fifth capacitor is coupled to the second terminal of the ninth switch, and the second terminal of the fifth capacitor is coupled to the reference voltage;

a sixth capacitor comprising a first terminal and a second terminal, wherein the first terminal of the sixth capacitor is coupled to the non-inverting input terminal of the differential amplifier;

an eleventh switch comprising a first terminal, a second terminal, and a control terminal, wherein the first terminal of the eleventh switch is coupled to the second terminal of the sixth capacitor, the second terminal of the eleventh switch is coupled to the reference voltage, and the control terminal of the eleventh switch is controlled by the first clock signal; and a twelfth switch comprising a first terminal, a second terminal, and a control terminal, wherein the first terminal of the twelfth switch is coupled to the second terminal of the sixth capacitor, the second terminal of the twelfth switch is coupled to the reference voltage, and the control terminal of the twelfth switch is controlled by the second clock signal.

* * * * *